United States Patent
Wu et al.

(10) Patent No.: US 12,010,726 B2
(45) Date of Patent: Jun. 11, 2024

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Min Wu, Beijing (CN); Feifei Sun, Beijing (CN); Bin Yu, Beijing (CN); Qi Xiong, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 17/310,088

(22) PCT Filed: Jan. 16, 2020

(86) PCT No.: PCT/KR2020/000796
§ 371 (c)(1),
(2) Date: Jul. 15, 2021

(87) PCT Pub. No.: WO2020/149660
PCT Pub. Date: Jul. 23, 2020

(65) Prior Publication Data
US 2022/0070938 A1    Mar. 3, 2022

(30) Foreign Application Priority Data
Jan. 17, 2019 (CN) .......................... 201910045534.9

(51) Int. Cl.
*H04W 74/0833* (2024.01)

(52) U.S. Cl.
CPC .............................. *H04W 74/0833* (2013.01)

(58) Field of Classification Search
None
See application file for complete search history.

(56) References Cited

U.S. PATENT DOCUMENTS 11,751,251 B2 *   9/2023  Li ........................ H04W 72/23
                                                                370/329
2011/0261763 A1   10/2011 Chun et al.
(Continued)

FOREIGN PATENT DOCUMENTS

EP          3873161 A1      9/2021
KR     10-2015-0051091 A    5/2015
(Continued)

OTHER PUBLICATIONS

International Search Report and Written Opinion of the International Searching Authority dated Apr. 28, 2020 in connection with International Application No. PCT/KR2020/000796, 11 pages.
(Continued)

*Primary Examiner* — Otis L Thompson, Jr.

(57) ABSTRACT

Embodiments of the present application provides an apparatus and a method for transmitting and receiving uplink data, and relates to the field of communication technologies. The method includes: performing uplink data transmission via a contention-based random access (RACH) procedure. The embodiments of the present application implement that, when transmitting uplink data in an RRC idle mode, the user equipment does not need to establish an RRC connection, and may directly transmit the uplink data via the RACH procedure, so that the power consumption of the UE may be reduced, and the waste of system resources may be reduced.

13 Claims, 12 Drawing Sheets

(56) References Cited

U.S. PATENT DOCUMENTS

| | | | |
|---|---|---|---|
| 2014/0362803 A1 | 12/2014 | Chun et al. | |
| 2018/0132282 A1* | 5/2018 | Ly | H04L 5/0091 |
| 2018/0220288 A1* | 8/2018 | Agiwal | H04W 4/30 |
| 2018/0220468 A1* | 8/2018 | Lin | H04W 48/16 |
| 2018/0317263 A1* | 11/2018 | Ishii | H04W 74/0833 |
| 2018/0332478 A1* | 11/2018 | Noh | H04W 74/0833 |
| 2019/0159258 A1* | 5/2019 | Islam | H04L 5/0005 |
| 2019/0223157 A1 | 7/2019 | Hwang et al. | |
| 2019/0335406 A1* | 10/2019 | Akkarakaran | H04L 27/261 |
| 2019/0335515 A1* | 10/2019 | Chen | H04W 74/0858 |
| 2020/0146069 A1* | 5/2020 | Chen | H04W 52/362 |
| 2020/0314908 A1* | 10/2020 | Hwang | H04W 74/0833 |
| 2020/0329505 A1* | 10/2020 | Shan | H04W 72/52 |
| 2021/0058973 A1* | 2/2021 | Fujishiro | H04W 74/0833 |
| 2021/0235511 A1* | 7/2021 | Golitschek Edler von Elbwart | H04L 1/08 |
| 2021/0345424 A1* | 11/2021 | Cirik | H04W 72/1263 |
| 2023/0262697 A1* | 8/2023 | Kim | H04L 5/0094 370/329 |
| 2023/0262839 A1* | 8/2023 | Park | H04L 5/0012 370/329 |
| 2023/0276504 A1* | 8/2023 | Kim | H04W 74/0833 370/329 |
| 2023/0283789 A1* | 9/2023 | Shen | H04N 19/172 375/240.26 |
| 2023/0284263 A1* | 9/2023 | Kim | H04W 24/10 370/329 |
| 2023/0389080 A1* | 11/2023 | Christoffersson | H04L 5/0048 |

FOREIGN PATENT DOCUMENTS

| | | |
|---|---|---|
| WO | 2017222327 A1 | 12/2017 |
| WO | 2020146831 A1 | 7/2020 |

OTHER PUBLICATIONS

3GPP TS 36.321 V15.4.0 (Dec. 2018), Technical Specification, 3rd Generation Partnership Project; Technical Specification Group Radio Access Network; Evolved Universal Terrestrial Radio Access (E-UTRA); Medium Access Control (MAC) protocol specification (Release 15), Dec. 2018, 131 pages.

Supplementary European Search Report dated Jan. 31, 2022, in connection with European Application No. 20742000.1, 15 pages.

Examination report dated Mar. 10, 2022, in connection with Indian Application No. 202137032521, 7 pages.

Intel Corporation, "Further consideration of 2-step CBRA," R2-1816697, 3GPP TSG-RAN WG2 Meeting #104, Spokane, USA, Nov. 12-16, 2018, 6 pages.

Mediatek Inc., "2-step RACH msgA and msgB contents," R2-1816685, 3GPP TSG-RAN WG2 Meeting #104, Spokane, USA, Nov. 12-16, 2018, 7 pages.

Nokia, et al., "On 2-step Random Access Procedure," R1-1901192, 3GPP TSG RAN WG1 Ad-Hoc Meeting 1901, Taipei, Taiwan, Jan. 21-25, 2019, 7 pages.

Vivo, "RAN2 impacts on 2-step RACH," R2-1818260 (Revision of R2-1814263), 3GPP TSG-RAN WG2 Meeting #104, Spokane, USA, Nov. 12-16, 2018, 5 pages.

Zte Corporation, et al., "Msg2 payload contents for 2-step RACH," R2-1817064 (Revision of R2-1814034), 3GPP TSG-RAN WG2 Meeting #104, Spokane, USA, Nov. 12-16, 2018, 9 pages.

Communication pursuant to Article 94(3) EPC dated Nov. 9, 2023, in connection with European Patent Application No. 20742000.1, 6 pages.

* cited by examiner

FIG. 8C

| Flag = 10 | TA Command | | Oct1 |
|---|---|---|---|
| TA Command | | ARI | Oct2 |
| UE Contention resolution ID | | | Oct3 |
| UE Contention resolution ID | | | Oct4 |
| UE Contention resolution ID | | | Oct5 |
| UE Contention resolution ID | | | Oct6 |
| UE Contention resolution ID | | | Oct7 |
| UE Contention resolution ID | | | Oct8 |

FIG. 8D

| Flag = 11 | TA Command | | Oct1 |
|---|---|---|---|
| TA Command | | ARI | Oct2 |
| UE Contention Resolution ID | | | Oct3 |
| UE Contention Resolution ID | | | Oct4 |
| UE Contention Resolution ID | | | Oct5 |
| UE Contention Resolution ID | | | Oct6 |
| UE Contention Resolution ID | | | Oct7 |
| UE Contention Resolution ID | | | Oct8 |
| Temporary C-RNTI | | | Oct9 |
| Temporary C-RNTI | | | Oct10 |

METHOD AND APPARATUS FOR PERFORMING COMMUNICATION IN WIRELESS COMMUNICATION SYSTEM

CROSS-REFERENCE TO RELATED APPLICATIONS

This application is a 371 National Stage of International Application No. PCT/KR2020/000796, filed Jan. 16, 2020, which claims priority to Chinese Patent Application No. 201910045534.9, filed on Jan. 17, 2019, the disclosures of which are herein incorporated by reference in their entirety.

BACKGROUND

1. Field

The present application relates to the field of communications technologies, and in particular, an apparatus and a method for transmitting and receiving uplink data.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

In a wireless mobile communication system, a user equipment (UE) may only transmit uplink data after establishing a radio resource control (RRC) connected mode, that is, the UE needs to initiate an RRC connection before transmitting uplink data, and may transmit uplink data only after the RRC connection is successfully established.

However, when the UE needs to transmit uplink data for multiple times, the RRC connection is needed to be re-established before transmitting uplink data every time. For example, for an Internet of Things (IOT) UE, many application scenarios are small packet data, for example, the meter reading service, etc., and if each small packet data is transmitted, an RRC connection needs to be established, resulting in a large power consumption of the UE and a waste of system resources.

The present application provides an apparatus and a method for transmitting and receiving uplink data, which may solve the problems that the UE consumes a large amount of power and wastes system resources. The technical solutions are provided as follows:

In a first aspect, a method for transmitting uplink data is provided, which is performed by a UE, and the method includes:
  performing uplink data transmission via a contention-based random access (RACH) procedure.

In a second aspect, a user equipment is provided, which includes:
  an uplink data transmission module, configured to perform uplink data transmission via a contention-based random access (RACH) procedure.

In a third aspect, a user equipment is provided, which includes:
  a memory, configured to store machine readable instructions, the instructions, when executed by the processor, causes the processor to perform the method for transmitting uplink data as shown in the first aspect.

The technical solutions provided by the present application are advantageous in the following aspects:

The present application provides a user equipment and a method for transmitting uplink data. As compared with the uplink data transmission in the RRC connected mode in the prior art, the present application performs uplink data transmission via a contention-based RACH procedure, that is, the UE in an RRC idle mode does not need to establish an RRC connection when transmitting the uplink data for multiple times, and the uplink data may be directly transmitted via the RACH procedure, so that the power consumption of the UE, and the waste of system resources may be reduced.

By the method of the present application, the power consumption of the UE, and the waste of system resources may be reduced.

BRIEF DESCRIPTION OF THE DRAWINGS

In order to more clearly illustrate the technical solutions in the embodiments of the present application, the drawings used in the description of the embodiments of the present application will be briefly described below.

FIG. 8C is a schematic structural diagram of MAC RAR when the indicated value of Flag field is 10, provided by an embodiment of the present application;

FIG. 8D is a schematic structural diagram of MAC RAR when the indicated value of Flag field is 11, provided by an embodiment of the present application;

DETAILED DESCRIPTION

Figure 1:
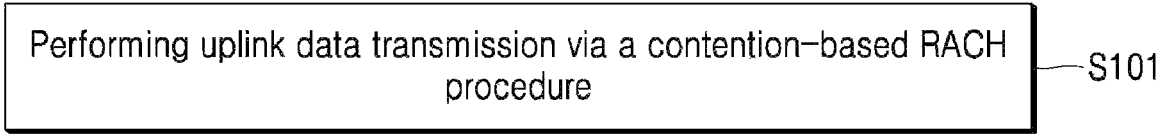
FIG. 1 is a schematic flowchart of a method for transmitting uplink data provided by an embodiment of the present application.

According to an embodiment of the disclosure, a method for transmitting uplink data, performed by a user equipment (UE), comprises: performing uplink data transmission via a contention-based random access (RACH) procedure.

Preferably, the performing uplink data transmission via a contention-based RACH procedure, comprises: transmitting a MsgA, wherein the MsgA comprises a physical random access channel (PRACH) and a physical uplink shared channel (PUSCH), and the PUSCH carries the uplink data and a UE contention resolution identifier (ID); monitoring the MsgB, wherein the MsgB carries a UE contention resolution ID, and if the UE contention resolution ID carried by the MsgB is the same as the UE contention resolution ID carried by the PUSCH of the MsgA, the RACH procedure is characterized to be successfully contended.

Preferably, the MsgB comprises: a physical downlink shared channel (PDSCH); wherein, the PDSCH comprises a physical media access control (MAC) random access response (RAR) corresponding to the UE, and the MAC RAR indicates the UE contention resolution ID.

Preferably, the MAC RAR comprises a Flag field; wherein, the Flag field indicates multiple types of MAC RARs, and different type of MAC RARs contains different control signaling fields, and the different type of MAC RARs have same payload size or different payload sizes.

Preferably, the Flag field contained in the MAC RAR is used to indicate two types of MAC RARs, wherein, the two types of MAC RARs comprises: the first type of MAC RAR, containing a UE contention resolution ID, or containing a UE contention resolution ID and at least one of a timing advance command (TA Command) and a temporary cell radio network temporary identifier (TC-RNTI); the second type of MAC RAR, containing an uplink grant (UL Grant), wherein the UL Grant is used to schedule retransmission of the PUSCH of MsgA, or containing an UL Grant and at least one of a TA Command and a TC-RNTI.

Preferably, the first type of MAC RAR further contains an acknowledgment resource indicator (ARI), and the ARI indicates a resource of a physical uplink control channel (PUCCH) used to carry ACK of MsgB.

Preferably, the MsgB comprises downlink control information (DCI), and the DCI indicates the UE contention resolution ID.

Preferably, the DCI contains a Flag field, and the Flag field contained in the DCI indicates two types of DCIs; wherein, the two types of DCIs comprise: the first type of the DCI, containing the UE contention resolution ID, or containing the UE contention resolution ID and at least one of a TA Command and a TC-RNTI; the second type of the DCI, containing the retransmission scheduling of the PUSCH of the MsgA, or containing the retransmission scheduling of the PUSCH in MsgA and at least one of a TA Command and a TC-RNTI.

Preferably, the RNTI value for scrambling a cyclic redundancy check (CRC) of the DCI is determined based on a time-frequency domain resource of the PRACH and a used preamble in the MsgA.

Preferably, the MsgB further contains an indicator, and the indicator is used to indicate a probability of the UE that is unsuccessful in a 2-step RACH procedure falling back to a 4-step RACH procedure.

Preferably, the performing uplink data transmission via a contention-based RACH procedure, comprises: in a radio resource control (RRC) idle mode, when there is uplink data to be transmitted, if a first predefined condition is satisfied, performing uplink data transmission via a contention-based RACH procedure; the first predefined condition comprises:
the base station configures a MsgA resource for early data transmission (EDT) in a cell system information block, and the MsgA resource for EDT is different from the MsgA resource for non-EDT; the size of uplink data to be transmitted satisfies the limit of the maximum transport block size (TBS) of the PUSCH of the MsgA.

Preferably, the performing uplink data transmission via a contention-based RACH procedure, comprises: in an RRC connected mode, when there is uplink data to be transmitted, if a second predefined condition is satisfied, performing uplink data transmission via a contention-based RACH procedure; the second predefined condition comprises: the base station configures a MsgA resource for EDT in a cell system information block, and the MsgA resource for EDT is different from the MsgA resource for non-EDT; the size of uplink data to be transmitted satisfies the restriction of the maximum TBS of the PUSCH of the MsgA; the second predefined condition further comprises at least one of the following: uplink timing is out-of-synchronization; there are no available resources for an uplink scheduling request within a pre-configured time window; after transmitting an uplink scheduling request, a response from a base station is not detected within a pre-configured time window; the uplink data to be transmitted requires a low latency.

Preferably, the performing uplink data transmission via a contention-based RACH procedure, comprises: receiving system broadcast information, and acquiring configuration about a TBS of the uplink data transmission; when the configuration of the TBS comprises multiple TBS values, determining the TBS value used by the uplink data transmission based on the size of the uplink data to be transmitted; determining the number of time units occupied by the uplink data transmission, according to the determined TBS value used by the uplink data transmission; performing the uplink data transmission according to the determined number of the time units.

Preferably, the method further comprising: the time unit comprises any one of the following: a subframe; a slot; an orthogonal frequency division multiplexing (OFDM) symbol; and a single carrier frequency division multiple access (SC-FDMA).

Preferably, the determining the number of time units occupied by the uplink data transmission, according to the determined TBS value used by the uplink data transmission, comprises: calculating a ratio between a TBS value used by the uplink data transmission and a minimum TBS value of the multiple TBS values, and determining an upward rounded value of the calculated ratio as the number of the time units occupied by the uplink data transmission.

Preferably, when the uplink data transmission occupies multiple time units, a transmission manner in the multiple time units comprises any one of the following: repeatedly transmitting within the multiple time units; performing rate matching within the multiple time units and transmitting at the matched code rate.

Preferably, the method further comprising any one of the following: when performing the uplink data transmission, transmitting the TBS value used by the uplink data transmission to the base station by using a demodulation reference signal (DMRS) of the PUSCH; when performing uplink data transmission, transmitting the TBS value used by the uplink data transmission to the base station by a piggyback manner of the PUSCH.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any restrictions thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to make the purpose, technical solution and advantage of the present application more clearly, the embodiments of the present application will be further described in detail below with reference to the accompanying drawings.

In an existing Long-Term Evolution (LTE) system, a Machine Type Communication (MTC) UE in an RRC idle mode and a Narrow Band Internet of Things (NB-IoT) UE in an RRC idle mode support Early Data Transmission (EDT), wherein the Msg3 (PUSCH) of the existing 4-step RACH procedure is used to carry all data to be transmitted. If the RACH procedure is successful, the UE may directly return to the RRC idle mode without establishing an RRC connection. As compared with the conventional method of establishing an RRC connection to transmit uplink data, the EDT is very suitable for small packet data transmission, which may effectively reduce UE power consumption and save system resources.

For a 5G new Radio (NR) UE, the EDT may be supported in a future release. In addition, the system may also define a 2-step RACH procedure, and then it is possible that the UE supports the EDT based on 2-step RACH and/or 4-step RACH, which will introduce new standard changes. The present application gives possible designs for these technical details.

In a wireless mobile communication system, a user equipment (UE) may only transmit uplink data after establishing a radio resource control (RRC) connected mode, that is, the UE needs to initiate an RRC connection before transmitting uplink data, and may transmit uplink data only after the RRC connection is successfully established.

However, when the UE needs to transmit uplink data for multiple times, the RRC connection is needed to be re-established before transmitting uplink data every time. For example, for an Internet of Things (IOT) UE, many application scenarios are small packet data, for example, the meter reading service, etc., and if each small packet data is transmitted, an RRC connection needs to be established, resulting in a large power consumption of the UE and a waste of system resources.

FIG. 1 is a schematic flowchart of a method for transmitting uplink data, which is specifically as follows:

Step S101: performing uplink data transmission via a contention-based RACH procedure.

In another possible implementation manner of the embodiment of the present application, Step S101 may specifically include: Step S1011 (not shown in the figure) and Step S1012 (not shown in the figure), wherein, Step S1011: transmitting a MsgA.

Wherein, the MsgA includes a physical random access channel (PRACH), and a physical uplink shared channel (PUSCH), wherein the PUSCH carries the uplink data, and a UE contention resolution identifier (ID).

Step S1012: monitoring a MsgB.

Wherein the MsgB carries a UE contention resolution ID, and if the UE contention resolution ID carried by the MsgB is the same as the UE contention resolution ID carried by the PUSCH of the MsgA, the RACH procedure is characterized to be successfully contended.

In another possible implementation manner of the embodiment of the present application, the MsgB includes: a physical downlink shared channel (PDSCH); wherein, the PDSCH includes a physical media access control (MAC) random access response (RAR) corresponding to the UE, and the MAC RAR indicates the UE contention resolution ID.

In another possible implementation manner of the embodiment of the present application, the MAC RAR contains a Flag field; wherein, the Flag field indicates multiple types of MAC RARs, and different types of MAC RARs contains different control signaling fields, and the different types of MAC RARs have same payload size or different payload sizes.

In another possible implementation manner of the embodiment of the present application, the Flag field contained in the MAC RAR is used to indicate two types of MAC RARs.

Wherein, the two types of MAC RARs include:
the first type of MAC RAR, containing a UE contention resolution ID, or containing a UE contention resolution ID and at least one of a timing advance command (TA Command) and a temporary cell radio network temporary identifier (TC-RNTI);
the second type of MAC RAR, containing an uplink grant (UL Grant), wherein the UL Grant is used to schedule retransmission of the PUSCH of MsgA, or containing an UL Grant and at least one of the TA Command and the TC-RNTI.

In another possible implementation manner of the embodiment of the present application, the first type of MAC RAR further contains an acknowledgment resource indicator (ARI), and the ARI indicates a resource of a physical uplink control channel (PUCCH) used to carry ACK of MsgB.

In another possible implementation manner of the embodiment of the present application, the MsgB includes downlink control information (DCI), and the DCI is used to indicate the UE contention resolution ID.

In another possible implementation manner of the embodiment of the present application, the DCI contains a Flag field, and the Flag field contained in the DCI indicates two types of DCIs;

wherein, the two types of DCIs include:
the first type of DCI, containing the UE contention resolution ID, or containing the UE contention resolution ID and at least one of the TA Command and the TC-RNTI;
the second type of DCI, containing the retransmission scheduling of the PUSCH of the MsgA, or containing the retransmission scheduling of the PUSCH of MsgA and at least one of the TA Command and the TC-RNTI.

In another possible implementation manner of the embodiment of the present application, the RNTI value for scrambling a cyclic redundancy check (CRC) of the DCI is determined based on a time-frequency domain resource of the PRACH and a used preamble in the MsgA.

In another possible implementation manner of the embodiment of the present application, the MsgB further contains an indicator, and the indicator is used to indicate a probability of the UE that is unsuccessful in a 2-step RACH procedure falling back to a 4-step RACH procedure.

In another possible implementation manner of the embodiment of the present application, Step S101 may further include: Step S101a (not shown in the figure), Step S101b (not shown in the figure), Step S101c (not shown in the figure), and Step S101d (not shown in the figure), wherein, Step S101a: transmitting a Msg1.

Wherein, the Msg1 includes: a PRACH.

Step S101b: monitoring a Msg2, wherein the Msg2 contains a PDCCH and a PDSCH scheduled by the PDCCH.

Wherein, the PDSCH contains a MAC RAR corresponding to the UE, and the MAC RAR schedules one PUSCH.

Step S101c: transmitting a Msg3.

Wherein, the Msg3 contains the PUSCH scheduled by the MAC RAR contained in the Msg2, and the PUSCH carries the uplink data and the UE contention resolution ID.

Step S101d: monitoring a Msg4.

Wherein, the Msg4 contains the PDCCH and the PDSCH scheduled by the PDCCH, and the PDSCH carries a UE contention resolution ID. If the UE contention resolution ID carried by the Msg4 is the same as the UE contention resolution ID carried by the Msg3, the RACH procedure is characterized to be successfully contended.

In another possible implementation manner of the embodiment of the present application, the MAC RAR indicates, via the "R" field or the "UL Grant" field, whether to fall back to the RACH procedure of the non-early data transmission (non-EDT).

In another possible implementation manner of the embodiment of the present application, Step S101 may further include: Step Sa (not shown in the figure), wherein, Step Sa: in the radio resource control (RRC) idle mode, when there is uplink data to be transmitted, if a first predefined condition is satisfied, performing the uplink data transmission via a contention-based RACH procedure;
the first predefined condition includes at least one of the following:
the base station configures a MsgA resource for EDT in a cell system information block, and the MsgA resource for EDT is different from the MsgA resource for non-EDT;

the size of uplink data to be transmitted satisfies the restriction of the maximum TBS of the PUSCH of the MsgA.

In another possible implementation manner of the embodiment of the present application, the Step S101 may further include: Step Sb (not shown in the figure), wherein, Step Sb: in an RRC connected mode, when uplink data is to be transmitted, if a second predefined condition is satisfied, performing uplink data transmission via a contention-based RACH procedure;

Wherein, the second predefined condition includes:

the base station configures a MsgA resource for EDT in a cell system information block, and the MsgA resource for EDT is different from the MsgA resource for non-EDT;

the size of uplink data to be transmitted satisfies the restriction of the maximum TBS of the PUSCH of the MsgA;

the second predefined condition further includes at least one of the following:

uplink timing is out-of-synchronization;

there are no available resources for an uplink scheduling request (SR) within a pre-configured time window;

after transmitting an uplink SR, the response of a base station is not detected within a pre-configured time window;

the uplink data to be transmitted requires a low latency.

In another possible implementation manner of the embodiment of the present application, Step S101 may specifically include: Step Sc (not shown in the figure), Step Sd (not shown in the figure), Step Se (not shown in the figure), and Step Sf (not shown in the figure), wherein, Step Sc: receiving system broadcast information, and acquiring configuration about a TBS of the uplink data transmission;

Step Sd: when multiple TBS values are included in the configuration of the TBS, determining the TBS value used by the uplink data transmission based on the size of the uplink data to be transmitted;

Step Se: determining the number of time units occupied by the uplink data transmission, according to the determined TBS value used by the uplink data transmission;

Step Sf: performing the uplink data transmission according to the determined number of the time units.

In another possible implementation manner of the embodiment of the present application, the time unit includes any one of the following: a subframe; a slot; an Orthogonal Frequency Division Multiplexing (OFDM) symbol; and a Single-carrier Frequency-Division Multiple Access (SC-FDMA).

In another possible implementation manner of the embodiment of the present application, Step Se may specifically include: Step Se1 (not shown in the figure) and Step Se2 (not shown in the figure), wherein, Step Se1: calculating a ratio between a TBS value used by the uplink data transmission and a minimum TBS value of the multiple TBS values;

Step Se2: determining an upward rounded value of the calculated ratio as the number of the time units occupied by the uplink data transmission.

In another possible implementation manner of the embodiment of the present application, when the uplink data transmission occupies multiple time units, a transmission manner within the multiple time units includes any one of the following:

repeatedly transmitting within the multiple time units;

*124performing rate matching within the multiple time units and transmitting at the matched code rate.

In another possible implementation manner of the embodiment of the present application, the method may further include:

when performing the uplink data transmission, transmitting the TBS value used by the uplink data transmission to the base station by using a DMRS of the PUSCH; and/or, when performing uplink data transmission, transmitting the TBS value used by the uplink data transmission to the base station by a piggyback manner of the PUSCH.

The embodiment of the present application provides a method for transmitting uplink data. As compared with the uplink data transmission in the RRC connected mode in the prior art, the embodiment of the present application performs uplink data transmission via a contention-based RACH procedure, that is, a user equipment in an RRC idle mode does not need to establish an RRC connection when transmitting the uplink data, and the uplink data may be directly transmitted via the RACH procedure, so that the power consumption of the UE, and the waste of system resources may be reduced.

The technical solutions of the present application and how the technical solutions of the present application solve the above technical problems will be described in detail below via specific embodiments. The following specific embodiments may be combined with each other, and the same or similar concepts or processes may not be described in some embodiments. Embodiments of the present application will be described below with reference to the accompanying drawings.

The method for transmitting uplink data will be described in detail in specific embodiments, including four embodiments. Embodiment 1 mainly introduces an EDT based on a 2-step RACH procedure, wherein the RACH procedure indicates a contention resolution signaling via the MAC RAR; Embodiment 2 mainly introduces an EDT based on the 2-step RACH procedure, wherein the RACH procedure indicates a contention resolution signaling via the DCI; Embodiment 3 mainly introduces an EDT of a 4-step RACH procedure; Embodiment 4 mainly introduces how to determine a corresponding resource assignment based on a selected TBS value when the UE performs EDT. The embodiments are described specifically as follows:

Embodiment 1. EDT Based on 2-Step RACH Procedure (Media Access Control (MAC) Random Access Response (RAR) Indicates a Contention Resolution Signaling This embodiment describes a method for a UE transmitting uplink data by using a 2-step RACH procedure. Herein, the UE may transmit data carried by a User Plane (UP) or a Control Plane (CP) via a 2-step RACH procedure, and the 2-step RACH procedure indicates the contention resolution signaling via the MAC RAR.

In this embodiment, the UE needs to perform the following steps:

*134Step 1: the UE transmitting the MsgA, wherein the MsgA includes: a Physical Random Access Channel (PRACH) and a Physical Uplink Shared Channel (PUSCH);

Step 2: the UE monitoring a MsgB within a pre-configured time window.

Wherein, the MsgB includes: a Physical Downlink Shared Channel (PDSCH), the PDSCH carrying the contention resolution signaling or retransmission scheduling of the PUSCH of MsgA via the MAC RAR, and indicating, by a Flag field contained in the MAC RAR, whether the MAC RAR to carry the contention resolution signaling or retransmission scheduling of the PUSCH of the MsgA.

If the Flag field indicates that the MAC RAR carries the contention resolution signaling, the RACH procedure ends; if the Flag field indicates that the MAC RAR schedules retransmission of the PUSCH of the MsgA, the UE falls back to the last two steps of the 4-step RACH procedure, i.e., transmitting a Msg3 (in this embodiment, it refers to retransmitting the PUSCH of the MsgA), and then monitoring the Msg4 (PDSCH, carrying the contention resolution signaling and other possible RRC signaling).

Figure 2:
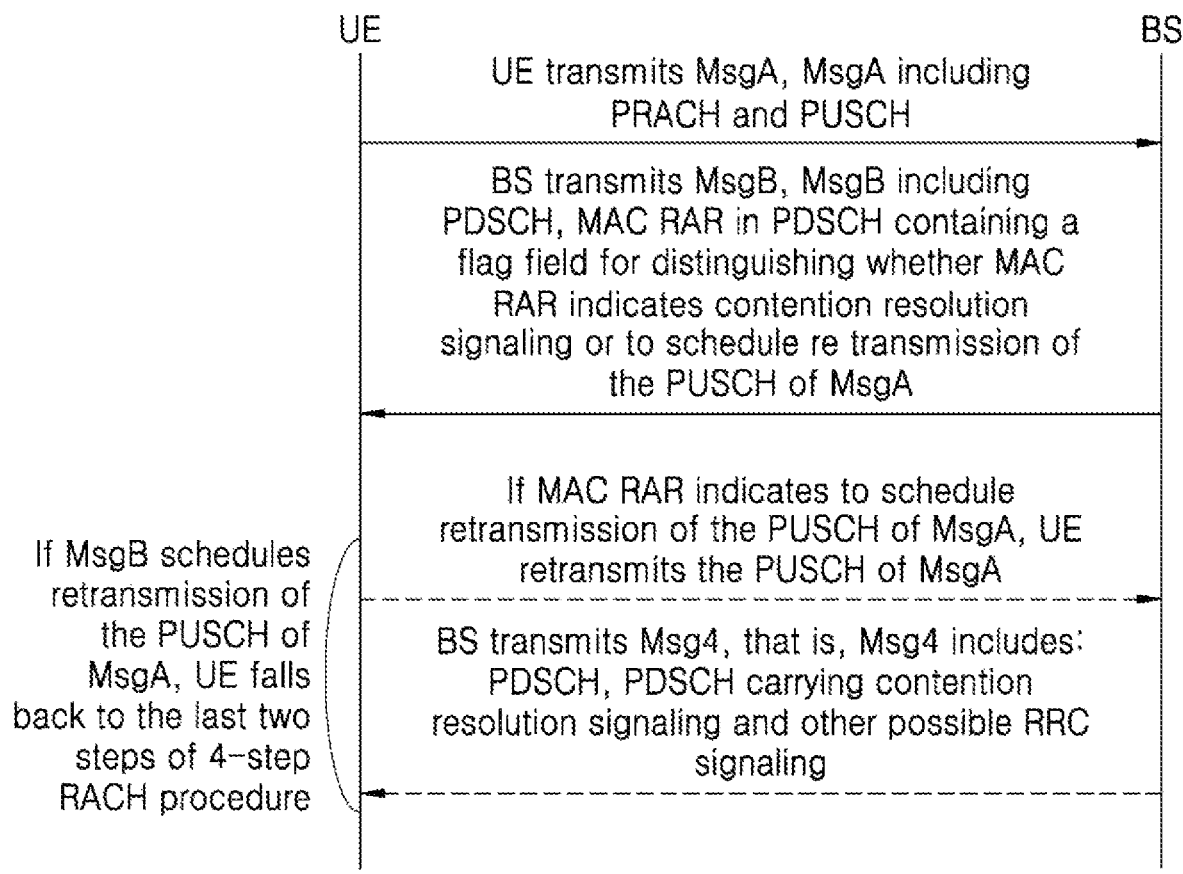
FIG. 2 is a schematic flowchart of a method for transmitting uplink data provided by Embodiment 1 of the present application.

FIG. 2 is a schematic flowchart of a method for transmitting uplink data provided by Embodiment 1 of the present application. Wherein, the MsgB is similar to the Msg2 of the existing 4-step RACH procedure, in which the PDCCHs are all scrambled by the Random Access Radio Network Temporary Identifier (RA-RNTI), and the PDSCHs contain MAC RARs of multiple preambles. The difference is that the Msg2 of the 4-step RACH procedure is used to schedule the Msg3, and the MsgB of the embodiment of the present application may indicate the contention resolution signaling. The MsgB contains an identification (ID) for contention resolution via the MAC RAR, e.g., an International Mobile Subscriber Identification Number (IMSI), a Serving-Temporary Mobile Subscriber Identity (S-TMSI), or a random ID. If the ID is the same as the ID reported by the UE in the PUSCH of the MsgA, the UE considers that the contention is successful, and vice versa.

Figure 3:
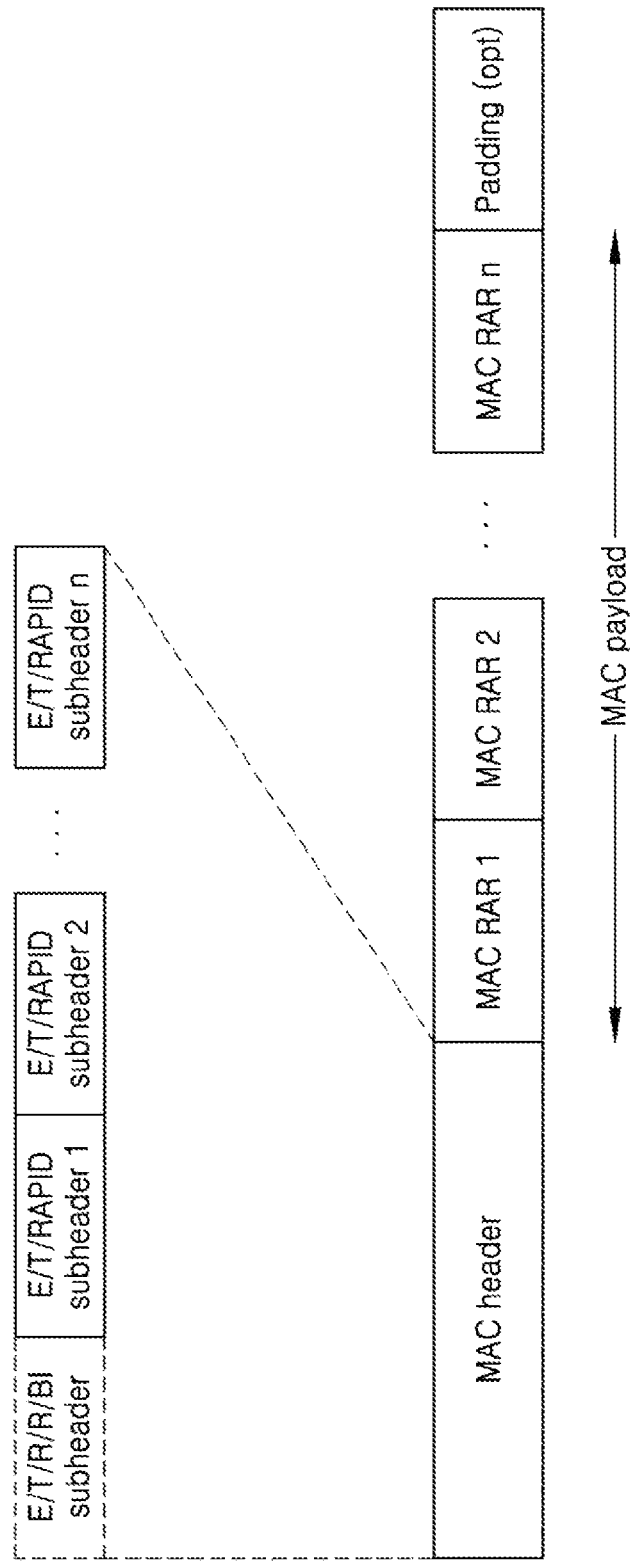
FIG. 3 is a schematic diagram of a structure of a MAC frame.

Wherein, as shown in FIG. 3, an MAC PDU of the RAR includes: a MAC header, a MAC payload, and a Padding, wherein the MAC header may include an E/T/R/R/BI subheader, and/or multiple E/T/RAPID subheaders, the MAC payload may include multiple MAC RARs, and each of the MAC RARs corresponds to each E/T/RAPID subheader in the MAC header.

Optionally, the MsgB contains a Fallback Indicator (FI) for indicating a probability of the UE that is unsuccessful in the 2-step RACH procedure falling back to the 4-step RACH procedure. Wherein, the unsuccessful contention in the 2-step RACH procedure means that the UE has not detected the MsgB, or the detected MsgB does not contain the MAC RAR of the preamble transmitted by the UE, or the contention resolution ID indicated by the detected MsgB is different from the ID in the PUSCH of the MsgA reported by the UE.

For example, FI is 2 bits, which may indicate 4 predefined or pre-configured values for the probability of fallback to the 4-step RACH procedure. Assuming that F1 indicates the probability of falling backing to the 4-step RACH procedure is 0.25, then in all UEs that is unsuccessful in the 2-step RACH procedure, 25% of the UEs will fall back to the 4-step RACH procedure, while the other 75% of UEs will try the 2-step RACH procedure again.

Specifically, the UE that is unsuccessful in the 2-step RACH procedure should generate a uniformly distributed random number between 0 and 1. If the random number is less than the fallback probability indicated by the FI, the UE will try 4-step RACH procedure.

For the embodiment of the present application, it is optional whether the MsgB contains an FI. If the MsgB does not contain an FI, then the UE that is unsuccessful in the 2-step RACH procedure determines whether to fall back to the 4-step RACH procedure based on a predefined, pre-configured or default probability.

For example, if the fallback probability is 1, then the UE that is unsuccessful in the 2-step RACH procedure should fall back to the 4-step RACH procedure; if the fallback probability is 0, then the UE that is unsuccessful in the 2-step RACH procedure continues to try the 2-step RACH procedure.

Figure 4:
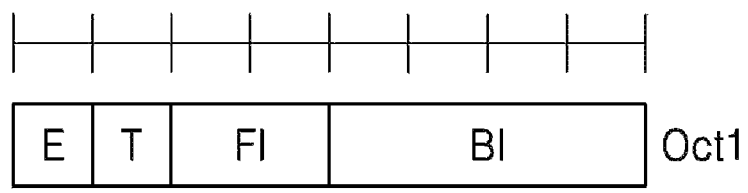
FIG. 4 is a schematic diagram of an E/T/R/BI MAC subheader provided by an embodiment of the present application.

In an optional implementation manner, the FI uses an "R" field with two reserved bits in the existing E/T/R/BI MAC subheader. FIG. 4 is a schematic diagram of an E/T/R/BI MAC subheader provided by an embodiment of the present application. As shown in FIG. 4, the E/T/R/R/BI MAC subheader of the existing system is modified to the E/T/FI/BI MAC subheader.

Figure 5A:
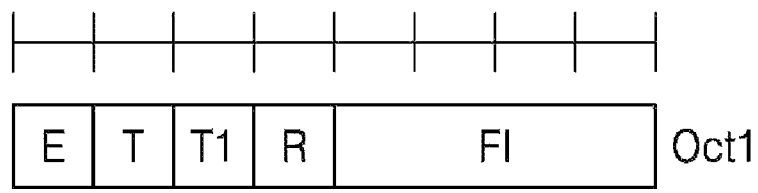
FIG. 5A is a schematic diagram of an E/T/T1/R/FI MAC subheader provided by an embodiment of the present application.

In another optional implementation manner, the FI is indicated by a newly-defined Media Access Control subheader (MAC subheader), and as shown in FIG. 5A, a new E/T/T1/R/FI MAC subheader is defined.

FIG. 5A is a schematic diagram of an E/T/T1/R/FI MAC subheader provided by an embodiment of the present application. As shown in FIG. 5A, the "E" field indicates whether the MAC subheader is the last MAC subheader of the MAC header, wherein if it is "0", it indicates that the MAC subheader is the last MAC subheader, then following with the MAC RAR or a padding bit, and if it is "1", it indicates that there is at least one MAC subheader of the E/T/RAPID after the MAC subheader; the "T" field indicates types of the MAC subheader, which one type is that containing a BI or FI, and the other type is that containing a random access preamble identifier (RACH Preamble ID, RAPID), wherein, if it is "0", it indicates that the MAC subheader contains a BI or FI, that is, E/T/T1/R/FI or E/T/T1/R/BI, and if it is "1", it indicates that the MAC subheader contains the RAP ID, that is, E/T/RAPID; the "T1" field indicates whether the MAC subheader contains a BI or FI, and if it is "0", it indicates that the MAC subheader contains a BI, that is, E/T/T1/R/BI, and if it is "1", it indicates that the MAC subheader contains an FI, that is, E/T/T1/R/FI; the "R" field is a reserved bit, which is set to "0".

Figure 5B:
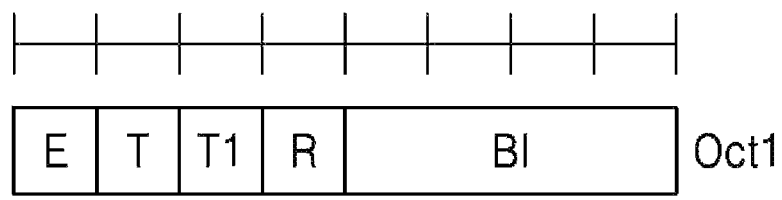
FIG. 5B is a schematic diagram of an E/T/T1/R/BI MAC subheader provided by an embodiment of the present application.

The E/T/R/BI MAC subheader of the existing system also needs to be modified for appropriate compatibility. FIG. 5B is a schematic diagram of an E/T/T1/R/BI MAC subheader provided by an embodiment of the present application. As shown in FIG. 5B, the existing E/T/R/R/BI MAC subheader is modified to the E/T/T1/R/BI MAC subheader, that is, borrowing a reserved bit "R" field to indicate whether the MAC subheader indicates BI or indicates FI.

In addition, when the MsgB contains both a BI and FI, the system specifies that the first MAC subheader of MsgB indicates the BI, and the second MAC subheader indicates the FI.

Optionally, the MAC RAR included in the foregoing MsgB reuses the payload size of the MAC RAR of the existing system, that is, still 7 bytes (56 bits), and uses the reserved bit "R" field of the existing MAC RAR as the Flag field, that is, the first bit of the MAC RAR, and the Flag field is used to indicate whether the MAC RAR to carry the contention resolution signaling or retransmission scheduling of the PUSCH of the MsgA.

Figure 6A:
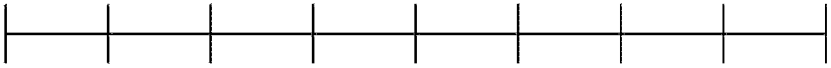
FIG. 6A is a schematic structural diagram of MAC RAR when the indicated value of Flag field is 0, provided by an embodiment of the present application.
Figure 6B:
FIG. 6B is a schematic structural diagram of MAC RAR when the indicated value of Flag field is 1, provided by an embodiment of the present application.

FIG. 6A is a schematic structural diagram of MAC RAR when the indicated value of Flag field is 0, provided by an embodiment of the present application. As shown in FIG. 6A, when the indicated value of the Flag field is "0", the MAC RAR is similar to the MAC RAR of the existing system, that is, a 12-bit "Timing Advance command (TA Command)", a 16-bit "Temporary Cell-Radio Network Temporary Identifier (TC-RNTI)" and 27-bit "UL Grant", each field having the same meaning as the existing system, and the "UL Grant" here is used to schedule retransmission of the PUSCH of the MsgA. FIG. 6B is a schematic structural diagram of MAC RAR when the indicated value of Flag field is 1, provided by an embodiment of the present application. As shown in FIG. 6B, when the indicated value of the Flag field is "1", the MAC RAR contains a 48-bit contention resolution signaling, that is, "UE Contention Resolution ID", the field having the same meaning as the "UE Contention Resolution ID" of an existing MAC CE, and the remaining 7 bits are used as the reserved bit "R" field.

Optionally, the MAC RAR contained in the foregoing MsgB is implemented by defining a new MAC RAR, wherein the new MAC RAR contains a 1-bit Flag field, and the Flag field is used to indicate two types of MAC RARs, which one type of MAC RAR carries a contention resolution signaling and another type of MAC RAR carries retransmission scheduling of the PUSCH of the MsgA, and the payload sizes of the two types of MAC RARs may be the same or different.

When the payload sizes of different types of MAC RARs are identical, during the UE looks up its own MAC RAR in the MAC PDU, i.e., looking up a MAC RAR corresponding to the Preamble ID used by the UE in the PRACH of the MsgA, the behavior of the UE is the same as that of the existing systems, that is, the UE reads each MAC subheader until reads its own RAPID, that is, the Preamble ID indicated by the RAPID is the Preamble ID used by itself in the PRACH of MsgA; since the payload sizes of all MAC RARs are identical, the position of the MAC RAR corresponding to its own RAPID in the MAC PDU may be determined according to the position of its own RAPID in the MAC header.

Figure 7A:
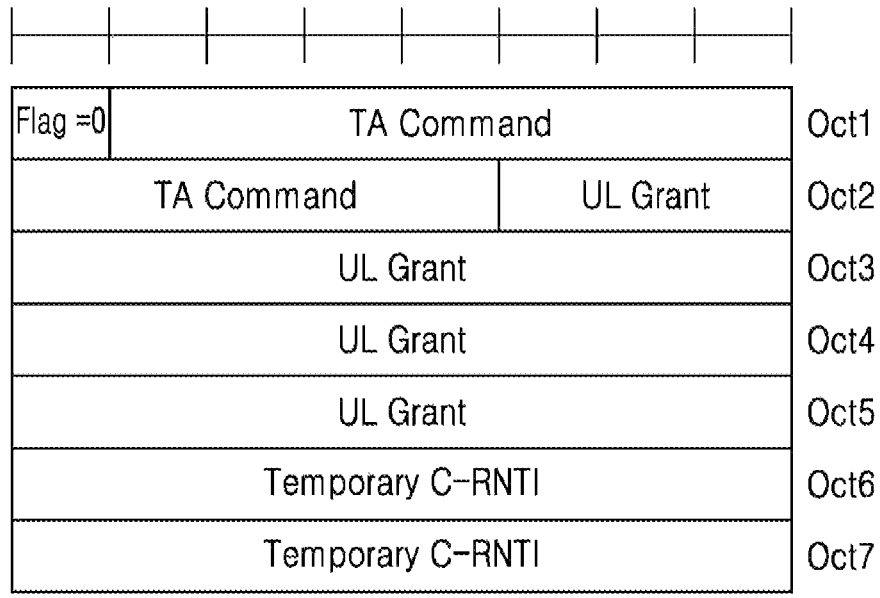
FIG. 7A is another schematic structural diagram of MAC RAR when the indicated value of Flag field is 0, provided by an embodiment of the present application.
Figure 7B:
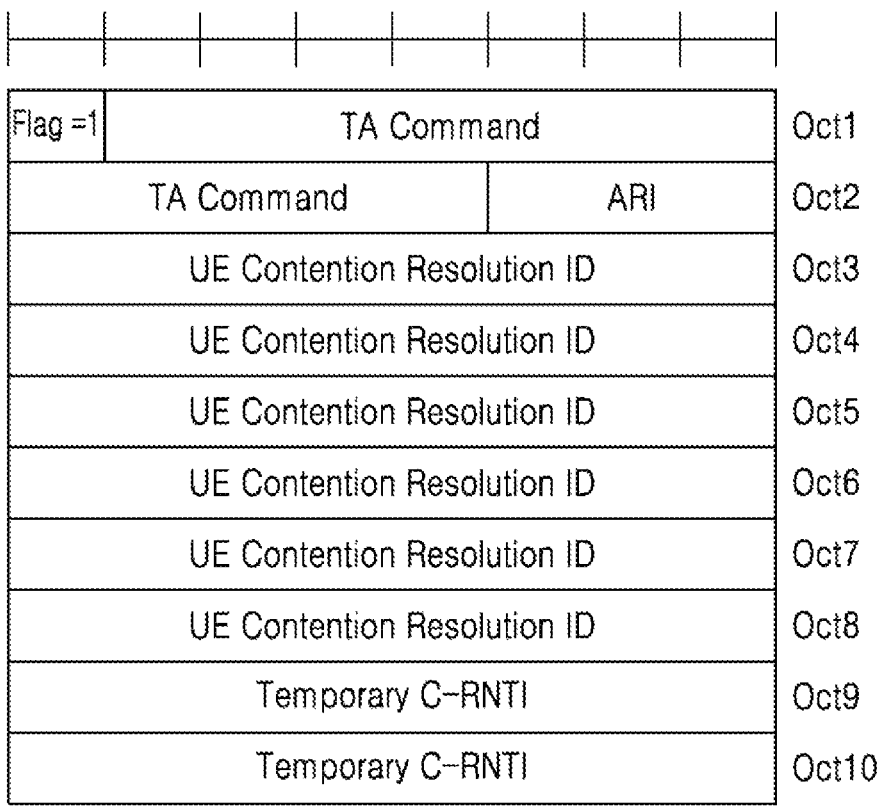
FIG. 7B is another schematic structural diagram of MAC RAR when the indicated value of Flag field is 1, provided by an embodiment of the present application.

When the payload sizes of different types of MAC RARs are different, during the UE looks up its own MAC RAR in the MAC PDU, i.e., looking up a MAC RAR corresponding to the Preamble ID used by the UE in the PRACH of the MsgA, the behavior of the UE is different from that of the existing systems, that is, the UE reads each MAC subheader until reads its own RAPID, that is, the Preamble ID indicated by the RAPID is the Preamble ID used by itself in the PRACH of MsgA; since the payload sizes of MAC RARs corresponding to different RAPIDs may be different, the UE needs to read MAC RAPs corresponding to respective RAPIDs before reading its own RAPID to determine types and payload sizes thereof, and may determine the position of the MAC RAR corresponding to its own RAPID in the MAC PDU after reading all MAC RARs corresponding to all the previous RAPIDs. FIG. 7A is another schematic structural diagram of MAC RAR when the indicated value of Flag field is 0, provided by an embodiment of the present application. FIG. 7B is another schematic structural diagram of MAC RAR when the indicated value of Flag field is 1, provided by an embodiment of the present application.

In an optional implementation manner, the load sizes of the two types of MAC RARs in FIG. 7A and FIG. 7B are identical. As shown in FIG. 7A, when the indicated value of the Flag field is "0", the MAC RAR is used to schedule retransmission of the PUSCH of the MsgA, which contains a 12-bit "TA Command", 16-bit "TC-RNTI", and 27-bit "UL grant", and the total payload size is 7 bytes (56 bits); as shown in FIG. 7B, when the indicated value of the Flag field is "1", the MAC RAR contains 48-bit "UE Contention resolution ID", 12-bit "TA Command", 16-bit "TC-RNTI", 3-bit "ACK Resource Indicator (ARI)", and the total payload size is 10 bytes (80 bits).

Regardless of the Flag field, the MAC RAR contains a TC-RNTI value. If the Flag field indicates that the MAC RAR is used to schedule retransmission of the PUSCH of the MsgA, that is, the contention procedure has not ended, the TC-RNTI contained in the MAC RAR is used for the subsequent contention resolution procedure; if the RACH procedure is successful, the TC-RNTI is the final C-RNTI; if the Flag field indicates that the MAC RAR is used to carry the contention resolution signaling, then the contention procedure ends, and the TC-RNTI contained in the MAC RAR may also be referred to as a C-RNTI.

Here, the MsgB supports Acknowledgement (ACK) feedback, that is, if the MsgB is successfully decoded, and the contention resolution signaling contained in the MsgB indicates that the 2-step RACH procedure is successful, then the UE should transmit an ACK via the PUCCH, wherein the above-mentioned "ARI" is used to indicate a PUCCH resource carrying the ACK, and the pre-configured PUCCH resource is broadcasted in the cell system information, for example, 3 bits indicates one of 8 pre-configured PUCCH resources.

In another optional implementation manner, the PUCCH resource used for ACK feedback of the MsgB is pre-configured, for example, by system information broadcast, or implicitly calculated by a predefined formula based on a pre-configured PUCCH reference resource, for example, an implicit correspondence of the PUCCH resource and the Preamble ID, that is, the PUCCH resource does not need to be explicitly indicated in the MAC RAR; or the MsgB does not support the ACK feedback, then the above "ARI" field may also be used as a reserved bit, that is, a 3-bit "R" field, which is used for byte alignment.

In another optional implementation manner, when the payload sizes of the two types of MAC RARs in FIG. 7A and FIG. 7B are identical, that is, the indicated value of the Flag field is "0", in addition to a 12-bit "TA Command", 16-bit "TC-RNTI" and 27-bit "UL grant", the MAC RAR further includes 24 bits of reserved bits, that is, regardless that the MAC RAR is used to carry the contention resolution signaling or retransmission scheduling of the PUSCH of the MsgA, the payload sizes of MAC RARs remain the same, i.e., 10 bytes (80 bits).

Optionally, the MAC RAR contained in the foregoing MsgB is implemented by defining a new MAC RAR, wherein the new MAC RAR contains a 2-bit Flag field, and the Flag field is used to indicate different types of MAC RARs. Different types of MAC RARs have different payload sizes, which one type of the MAC RARs is used to schedule the retransmission of the Msg3 PUSCH, and in addition, three types of MAC RARs are used to carry the contention resolution signaling, which correspond to different RACH trigger events. For example, when the trigger event is the EDT in the RRC idle mode, the MAC RAR may only contain the contention resolution signaling. If the contention is successful, there is no uplink transmission subsequently, and the MAC RAR does not need to contain the TA Command and the C-RNTI; when the trigger event is the uplink out-of-synchronization of the RRC connected mode, the MAC RAR should contain a contention resolution signaling and a TA Command, without a need of containing the C-RNTI; when the trigger event is the RRC establishment or reestablishment, the MAC RAR should contain a contention resolution signaling, TA Command and C-RNTI.

Figure 8A:
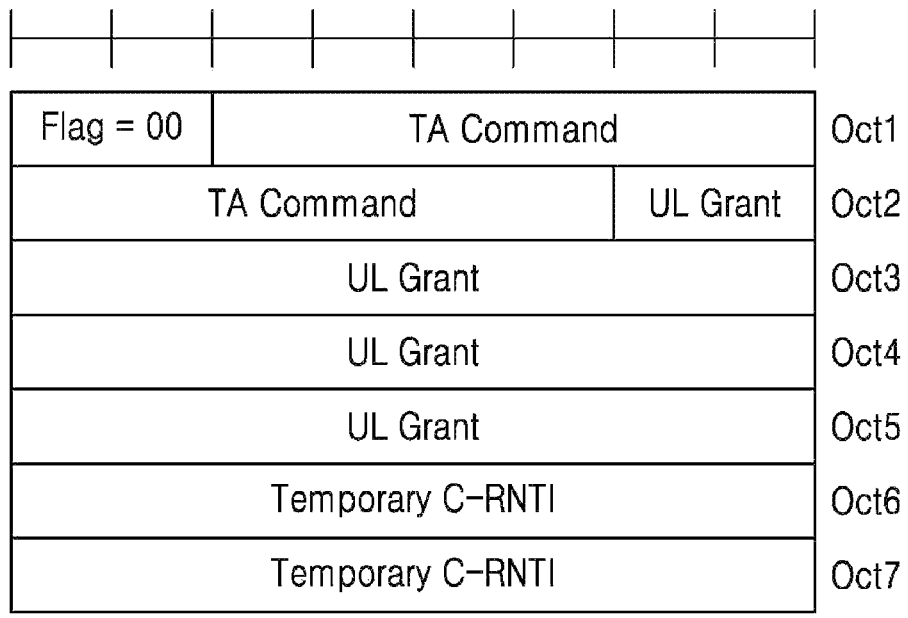
FIG. 8A is a schematic structural diagram of MAC RAR when the indicated value of Flag field is 00, provided by an embodiment of the present application.
Figure 8B:
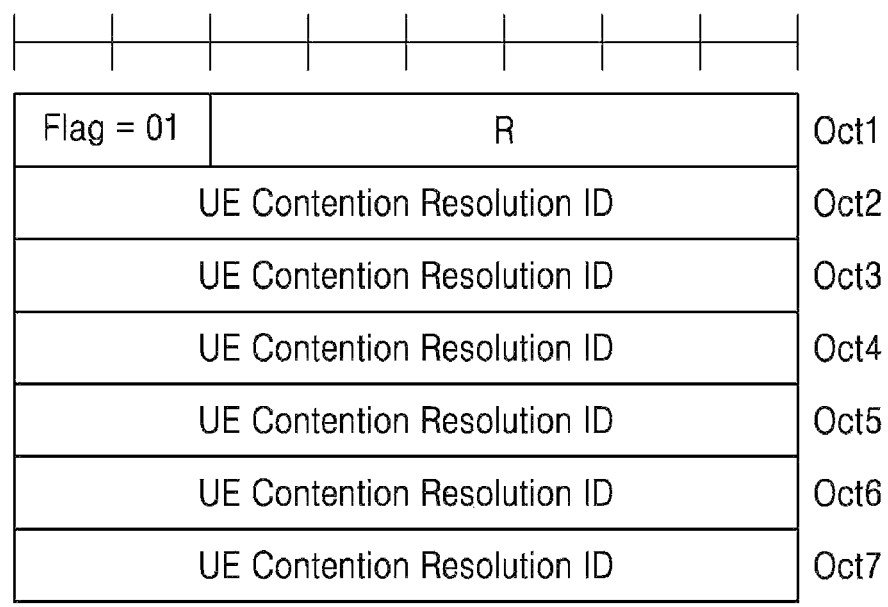
FIG. 8B is a schematic structural diagram of MAC RAR when the indicated value of Flag field is 01, provided by an embodiment of the present application.

FIG. 8A is a schematic structural diagram of MAC RAR when the indicated value of Flag field is 00, provided by an embodiment of the present application. As shown in FIG. 8A, when the indicated value of the Flag field is "00", the MAC RAR is used to schedule retransmission of the PUSCH of the MsgA, containing a 12-bit "TA Command", 16-bit "TC-NRTI", and 26-bit "UL grant", and the total payload size is 7 bytes (56 bits);

FIG. 8B is a schematic structural diagram of MAC RAR when the indicated value of Flag field is 01, provided by an embodiment of the present application. As shown in FIG. 8B, when the indicated value of the Flag field is "01", the MAC RAR is used for contention resolution, only containing a 48-bit "UE Contention resolution ID" and 7-bit reserved bit "R", and the total payload size is 7 bytes (56 bits);

FIG. 8C is a schematic structural diagram of MAC RAR when the indicated value of Flag field is 10, provided by an embodiment of the present application. As shown in FIG. 8C, when the indicated value of the Flag field is "10", the MAC RAR is used for contention resolution and TA adjustment, containing a 12-bit "TA Command", 48-bit "UE Contention resolution ID", and 2-bit "ARI", and the total payload size is 8 bytes (64 bits).

FIG. 8D is a schematic structural diagram of MAC RAR when the indicated value of Flag field is 11, provided by an embodiment of the present application. As shown in FIG. 8D, when the indicated value of the Flag field is "11", the MAC RAR is used for contention resolution, TA adjustment, and C-RNTI configuration, containing a 12-bit "TA Command", 16-bit "TC-RNTI", 48-bit "UE Contention resolution ID", and 2-bit "ARI", and the total payload size is 10 bytes (80 bits).

The above 2-bit "ARI" is exactly the same as the "ARI" in FIG. 7B, that is, being used for indicating the PUCCH resource for ACK of the MsgB. In another optional implementation manner, the "ARI" may also be replaced with 2-bit reserved "R".

In another optional solution, the payload sizes of the four types of MAC RARs in FIGS. 8A, 8B, 8C, and 8D should remain the same, that is, 10 bytes (80 bits), and for a MAC RAR with a valid payload less than 80 bits, for example, when the indicated values of the Flag fields are "00", "01" and "10", the examples of MAC RARs in FIGS. 8A, 8B, and 8C should be added with 24 bits, 24 bits, 16 bits of reserved bits "R", respectively.

In the above embodiment, if the Flag field indicates that the MsgB schedules the retransmission of the PUSCH of the MsgA, the behavior of the UE after retransmitting the PUSCH of the MsgA is the same as the behavior of a UE in the existing system after transmitting the Msg3 in the 4-step RACH procedure, that is, monitoring a DCI (DCI format 1_0) which scheduling a PDSCH (Msg4), or monitoring a DCI (DCI format 0_0) which scheduling the PUSCH (Msg3) retransmission. Accordingly, when the Flag field indicates that the MsgB schedules the retransmission of the PUSCH of the MsgA, the behavior of the UE may be understood as a fallback to the last two steps of the 4-step RACH procedure.

In another optional implementation manner, the behavior of the UE after retransmitting the PUSCH of the MsgA is different from the behavior of a UE in the existing system after transmitting a Msg3 in the 4-step RACH procedure, that is, the UE monitoring the MsgC instead of the Msg4, where the MsgC is a PDCCH, and carrying the contention resolution signaling or retransmission scheduling of the PUSCH of the MsgA via the DCI. Herein, the MsgC is similar with the MsgB in Embodiment 2 below, that is, carrying the contention resolution signaling via the DCI; since the TC-RNTI and the TA command has been indicated in the MsgB herein, there is a difference that the MsgC does not need to carry the TC-RNTI and the TA command.

Optionally, the foregoing MsgC is implemented by adding a 1-bit Flag field to the existing DCI format 0_0. For example, the indicated value of the Flag field is "0", indicating that the DCI is used to carry a contention resolution signaling, that is, at least containing one DCI field for the contention resolution ID; the indicated value of the Flag field is "1", indicating that the DCI is used to schedule retransmission of the PUSCH of the MsgA, that is, to reuse the interpretation of the existing DCI format 0_0.

Optionally, the foregoing MsgC is used as the Flag field via 1 bit of a certain DCI field of the existing DCI format 0_0, so the purpose of this design is not to increase the load size of the DCI, but when the Flag field indicates that the DCI is used to schedule retransmission of the PUSCH of the MsgA, the range of indicated values of the DCI field from which 1 bit is borrowed will be reduced by half.

Embodiment 2. EDT Based on a 2-Step PRACH Procedure (DCI Indicates a Contention Resolution Signaling)

This embodiment describes a method for a UE transmitting uplink data by using a 2-step RACH. Herein, the UE may transmit data carried by a UP or a CP via a 2-step RACH procedure. The 2-step RACH procedure carries a contention resolution signaling via the DCI. In this embodiment, the UE needs to perform the following steps:

Step 1: the UE transmitting the MsgA, wherein the MsgA includes: a PRACH and a PUSCH;
Step 2: the UE monitoring the MsgB within a pre-configured time window.

Wherein, the MsgB includes a PDCCH which carries the contention resolution signaling or schedules retransmission of the PUSCH of the MsgA via the DCI, and one Flag field in the DCI is used to indicate whether the DCI is used to carry the contention resolution signaling or to schedule retransmission of the PUSCH of the MsgA.

If the Flag field indicates that the MsgB carries the contention resolution signaling, and the contention resolution signaling shows that the 2-step RACH procedure is successful, then the UE returns to the RRC idle mode (the UE determines that the RRC is in the idle mode); if the Flag field indicates that the MsgB schedules retransmission of the PUSCH of the MsgA, then the UE retransmits the PUSCH of the MsgA, and repeats the second step in Embodiment 2 until the 2-step RACH procedure is successful, or the contention resolution window expires.

Figure 9:
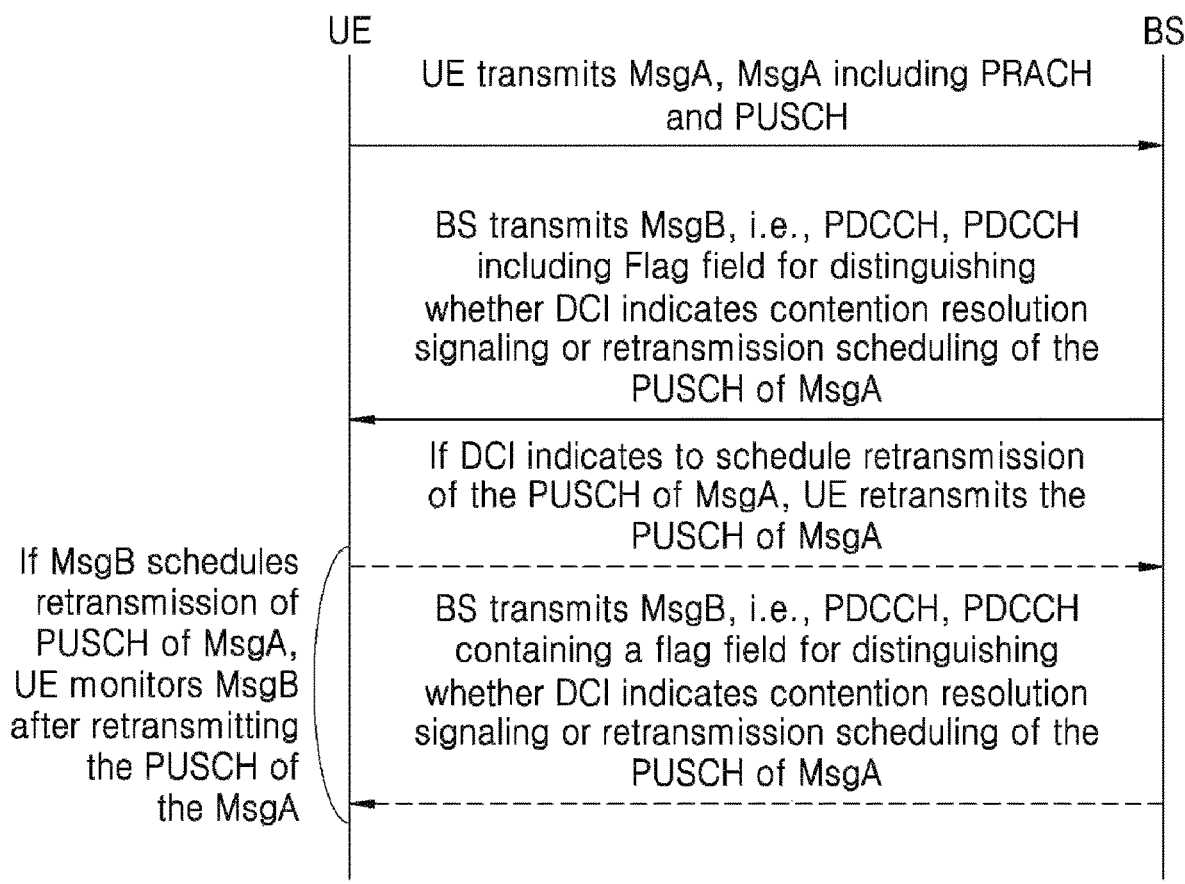
FIG. 9 is a schematic flowchart of a method for transmitting uplink data provided by Embodiment 2 of the present application.

FIG. 9 is a schematic flowchart of the embodiment. Wherein, the MsgB is a PDCCH, that is, indicating the contention resolution signaling or retransmission scheduling of the PUSCH of the MsgA via the DCI, wherein the DCI contains an ID for contention resolution, such as an IMSI, an S-TMSI, or a random ID. If the ID is the same as an ID reported by the UE in the PUSCH of the MsgA, then the UE considers that the contention is successful, and vice versa.

In this embodiment, the RNTI value for the UE monitoring the PDCCH of the MsgB corresponds to the RACH resource (RACH Occasion, RO) and the Preamble ID used by the PRACH of the MsgA, that is, different ROs correspond to different RNTI values, and different Preamble IDs on the same RO also correspond to different RNTI values. The RNTI for scrambling the CRC of the PDCCH of the MsgB may be referred to as a Preamble-RNTI, and the Preamble-RNTI may be acquired by the following formula:

Preamble-RNTI=1+pre_id+64×s_id+64×14×t_id+64×
14×80×f_id+64×14×80×8×ul_carrier_id;

Wherein, the pre_id is the Preamble ID used by the PRACH of the MsgA, and the value interval thereof is 0<=pre_id<64; the s_id is the serial number of the first OFDM symbol or Single-carrier Frequency-Division Multiple Access (SC-FDMA) symbol occupied by the PRACH of the MsgA, and the value interval thereof is 0<=s_id<14; the t_id is the serial number of the first slot occupied by the PRACH of MsgA in a system frame, the value interval thereof is 0<=t_id<80; the f_id is the serial number of the PRACH of the MsgA in the frequency domain, and the value interval thereof is 0<=f_id<14; the ul_carrier_id is the uplink carrier type of MsgA, wherein 0 represents a normal uplink (NUL) carrier, and 1 represents a supplement UL (SUL) carrier.

The foregoing DCI of the MsgB contains at least one of the following DCI fields:

A backoff indicator (BI), which is used to indicate the backoff parameter for next try to the UE that is unsuccessful in the RACH procedure. The specific meaning may reuse the BI subheader contained in the RAR MAC PDU in the existing system, for example, 4 bits, and the difference is that it is carried by the DCI;

A fallback indicator (FI), which is used to indicate the probability of fallback to the 4-step RACH procedure for the UE that is unsuccessful in this 2-step RACH procedure. For example, the FI contains 2 bits and may indicate 4 predefined or pre-configured values for the probability of fallback to the 4-step RACH procedure. Assuming that FI indicates the probability of fallback to the 4-step RACH procedure is 0.25, then in all UEs that is unsuccessful in this 2-step RACH procedure, 25% of all UEs will fall back to the 4-step RACH procedure, others 75% of UEs will try the 2-step RACH procedure again. Each UE that is unsuccessful in this 2-step RACH procedure should generate a random number that is uniformly distributed between 0 and 1. If the random number is less than the fallback probability indicated by FI, the UE will try 4-step RACH procedure.

A Timing Advanced (TA) Command, which is used to adjust the uplink timing synchronization of the UE that is successful in the 2-step RACH procedure, and the specific meaning may reuse the "TA Command" field in the MAC RAR of the existing system, for example, 12 bits.

TC-RNTI, which is used for data transmission of subsequent transmissions of the UE, and the specific meaning may reuse the "TC-RNTI" in the MAC RAR in the existing system, for example, 16 bits. When the Flag field indicates that the DCI contains the contention resolution signaling, the TC-RNTI contained in the DCI may also be referred to as a C-RNTI.

A flag field, which is used to indicate the interpretation type of the DCI, that is, the indication field in the DCI may use different interpretations according to the Flag field. Optionally, the Flag field is 1 bit. If the Flag is "0", it indicates that the DCI carries the contention resolution signaling, and if the Flag is "1", it indicates that the DCI schedules retransmission of the PUSCH of the MsgA. Optionally, the Flag field is 2 bits, "00" is used to indicate that the DCI carries the contention resolution signaling, "01" is used to indicate that the DCI schedules retransmission of the PUSCH of the MsgA, and "10" is used to indicate the DCI schedules one PDSCH, wherein the PDSCH contains a contention resolution signaling and may contain an RRC message and/or the downlink data of the UE, and "11" is a reserved value.

If the DCI of the MsgB is interpreted as indicating the contention resolution signaling according to the Flag field, then at least one of the following DCI fields is contained:

A contention resolution ID, for example, an IMSI, S-TMSI, or random ID, which may specifically reuse the MAC CE signaling "UE Contention Resolution ID" of the existing system, for example, 48 bits.

If the DCI of the MsgB is interpreted as scheduling retransmission of the PUSCH of the MsgA according to the Flag field, then at least one of the following DCI fields is contained:

Indicating whether the PUSCH retransmission is based on frequency hopping, which may reuse the "Frequency hopping flag" field contained in the UL scheduling DCI or contained in the RAR grant in the existing system.

Indicating the frequency domain resource assignment of the PUSCH retransmission, which may reuse the "Frequency domain resource assignment" field contained in the UL scheduling DCI or contained in the RAR grant in the existing system.

Indicating the time domain resource assignment of the PUSCH retransmission, which may reuse the "Time domain resource assignment" field contained in the RAR grant contained in the UL scheduling DCI or contained in the RAR grant in the existing system.

Indicating MCS of the PUSCH retransmission, which may reuse the "Modulation and coding scheme (MCS)" field contained in the UL scheduling DCI or contained in the RAR grant in the existing system.

Indicating the transmission power adjustment of the PUSCH retransmission, which may reuse the "TPC command for PUSCH" field contained in the UL scheduling DCI or contained in the RAR grant in the existing system.

Triggering reporting of aperiodical Channel State Information (CSI), which may reuse the "CSI request" field contained in the UL scheduling DCI or contained in the RAR grant in the existing system.

If the DCI of the MsgB is interpreted as scheduling a PDSCH according to the Flag field, the PDSCH should contain a contention resolution signaling, and an RRC signaling and/or downlink data, and the DCI should contain at least one of the following DCI fields:

Indicating the frequency domain resource assignment of the PDSCH, which may reuse the "Frequency domain resource assignment" field contained in UL scheduling DCI in the existing system.

Indicating the time domain resource assignment of the PDSCH, which may reuse the "Time domain resource assignment" field contained in UL scheduling DCI in the existing system.

Indicating the MCS of the PDSCH, which may reuse the "MCS" field contained in UL scheduling DCI in the existing system.

Indicating the mapping of a Physical Resource Block (PRB)-Virtual Resource Block (VRB) used by the PDSCH, which may reuse the "VRB-to-PRB mapping" field contained in the UL scheduling DCI in the existing system.

Here, the MsgB is similar with the Msg4 of the 4-step RACH procedure in the existing system, that is, the MsgB is composed of the PDCCH and its scheduled PDSCH, and the PDSCH should contain a contention resolution signaling. For example, an ID of the UE for contention resolution contained in the PUSCH of MsgA is indicated, via a Media Access Control-Control Element (MAC CE) signaling or an RRC signaling.

Optionally, in addition to the contention resolution signaling, the PDSCH of the MsgB further contains an RRC signaling to establish or resume an RRC connection. For example, if there is too much arrived uplink data of the UE, which is unable to be completely carried by the PUSCH of the MsgA, the UE may transmit a part of the uplink data via the PUSCH of the MsgA and send the data Buffer Status Reporting (BSR). The PDSCH of the MsgB may contain RRC configuration to establish or resume an RRC connection.

Optionally, in addition to the contention resolution signaling, the PDSCH of the MsgB further contains the DL data of the UE. For example, the DL data contained in the PDSCH of the MsgB is application layer response of the UL data carried by the PUSCH of the MsgA.

Optionally, in addition to the contention resolution signaling, the PDSCH of the MsgB further contains a MAC CE to indicate an adjustment of the uplink timing advance, that is, a TA Command. In other words, if the DCI of the MsgB is interpreted as scheduling one PDSCH, the TA Command will not be indicated in the DCI, but will be indicated via MAC CE signaling carried by the PDSCH of the MsgB.

Optionally, in addition to the contention resolution signaling, the PDSCH of the MsgB further contains an indication of TC-RNTI or C-RNTI. In other words, if the DCI of the MsgB is interpreted as scheduling one PDSCH, the TC-RNTI or C-RNTI will not be indicated in the DCI, but indicated via MAC CE signaling or RRC signaling carried by the PDSCH of the MsgB.

If the system supports ACK feedback of the MsgB, then the DCI of MsgB may also contain at least one of the following DCI fields:

Indicating the transmission power adjustment of the PUCCH carrying the ACK of the MsgB, which may reuse "TPC command for scheduled PUCCH" field contained in the DCI in the existing system.

Indicating the resource of the PUCCH carrying the ACK of the MsgB, which may reuse "PUCCH resource indicator" field contained in the DCI in the existing system.

Indicating the time of the PUCCH carrying the ACK of the MsgB, which may reuse "PDSCH-to-HARQ_feedback timing indicator" field contained in the DCI in the existing system.

Here, similar to the ACK feedback of the Msg4 in the existing 4-step RACH procedure, the system supports the ACK feedback of the MsgB, and does not support the NACK feedback of the MsgB, that is, only when the MsgB is successfully decoded and the contention resolution is successful, the UE feeds back the ACK.

For example, when the DCI of the MsgB carries the contention resolution signaling, and the contention resolution signaling carried by the DCI shows that the RACH procedure is successful, the UE should transmit an ACK; or, when the DCI of the MsgB schedules a PDSCH, which the PDSCH contains the contention resolution signaling, and possibly contains an RRC message and/or the downlink data, and the PDSCH is successfully decoded, and the contention resolution signaling carried by the PDSCH shows that the RACH procedure is successfully contended, then the UE should transmit an ACK.

The 2-step RACH procedure proposed in Embodiment 1 and Embodiment 2 may be applied to any system, such as a 5G NR system. In addition to containing a contention resolution ID and other necessary control signaling, the PUSCH of the MsgA may also carry the uplink data of the UE. If the RACH procedure is successfully contended, the uplink data transmission succeeds.

The uplink data of the UE carried by the PUSCH of the MsgA in the 2-step RACH procedure may be used for the UE in the RRC idle mode. If the RACH procedure is successful, the UE may return to the RRC idle mode without establishing an RRC connection, that is, the EDT, which reduces UE power consumption and improves the latency of data transmission.

Optionally, only when the uplink data to be transmitted of the UE in the RRC idle mode may be completely carried by the PUSCH of the MsgA, that is, the MAC PDU size that carries all data and the necessary control signaling of the UE must satisfy the restriction of the maximum TBS of the PUSCH of the MsgA, the UE may trigger the 2-step RACH procedure to carry the UE data via the PUSCH of the MsgA.

Optionally, regardless of whether the uplink data to be transmitted of the UE in the RRC idle mode may be completely carried by the PUSCH of the MsgA, the UE may trigger the 2-step RACH procedure to carry data via the PUSCH of the MsgA. When the uplink data of the UE to be transmitted cannot be completely carried by the PUSCH of the MsgA, the UE may carry a part of the data via the PUSCH of the MsgA, and send the data BSR, or request to establish an RRC connection. If the RACH procedure is successful, the UE may enter the RRC connected mode to transmit the remaining uplink data.

The uplink data of the UE carried by the PUSCH of the MsgA in the 2-step RACH procedure may also be used for the UE in the RRC connected mode. For example, when there is arrived uplink data for the UE in the RRC connected mode, for some data services requiring a low latency, there may be no available uplink grant in the required latency, or the uplink grant cannot be timely acquired in the required latency, then the UE may transmit data directly via the RACH procedure to meet the latency requirements. For another example, when there is arrived uplink data for the UE in the RRC connected mode, which does not meet the condition for transmitting uplink data, for example, there is no available TA, or no available uplink grant, that is, uplink timing is out-of-synchronization, or response from the base station is not received after transmitting the uplink SR, the UE must prepare the condition for transmit uplink data via the RACH procedure, then the UE may directly transmit data via the RACH procedure without waiting for an available TA or available uplink grant to transmit data, to reduce UE power consumption.

Optionally, the UE may trigger the 2-step RACH procedure to carry data via the PUSCH in MsgA, if there is arrived uplink data for the UE in the RRC connected mode, the size of data of the UE to be transmitted satisfies the restriction of the maximum TBS of the PUSCH of the MsgA, and one of the following conditions is satisfied: there is no available resource for the uplink SR within a predefined or pre-configured time window, or there is no received response from the base station within a predefined or pre-configured time window after transmitting the uplink SR, or the uplink timing is out-of-synchronization for the UE, or the data to be transmitted requiring a low latency.

The 2-step RACH procedure proposed in Embodiment 1 and Embodiment 2 may be applied to other trigger events, such as establishing an RRC connection, resuming an RRC connection, uplink timing is out-of-synchronization, and an events that there is no available resource for the uplink SR within a predefined or pre-configured time window or there is no received response from the base station within a predefined or pre-configured time window after transmitting the uplink SR. In addition to the contention resolution ID, the PUSCH of the MsgA also indicates the triggering reason of the RACH procedure.

Optionally, the 2-step RACH procedure proposed in Embodiment 1 and Embodiment 2 is used for the EDT, that is, the UE in the RRC idle mode transmits data via the 2-step RACH procedure without establishing an RRC connection, the system specifies the MsgA resource pool for the 2-step RACH of the EDT is different form the MsgA resource pool for other trigger events (i.e., non-EDT), that is, the base station configures the corresponding MsgA resource pool for the EDT and the non-EDT, respectively, and the PUSCH of the MsgA resource pool for the EDT supports a larger TBS than the PUSCH of the MsgA resource pool for the non-EDT.

If the 2-step RACH procedure of the EDT is unsuccessful, the UE may fall back to the 2-step RACH procedure of the non-EDT (for triggering events other than the EDT), that is, initiating the 2-step RACH procedure via another MsgA resource pool and establishing an RRC connection, and enters the RRC connected mode to transmit data; or the UE falling back to the 4-step RACH procedure of the EDT, wherein it is assumed that the system supports the 4-step RACH procedure for the EDT, and the Msg1 resource pool of the 4-step RACH procedure of the EDT is different from the Msg1 resource pool of the non-EDT; or the UE falls back to the 4-step RACH procedure of the non-EDT, that is, establishing an RRC connection via the 4-step RACH procedure, and entering the RRC connected mode to transmit data.

Optionally, the UE in the RRC idle mode fails in the N attempts of the 2-step RACH procedure of the EDT, and the UE should fall back to the 4-step RACH procedure of the EDT to transmit uplink data. Herein, N may be fixed by the system, for example, N is fixed to 1; N may also be configured by the system, for example, configured in the cell system information.

Optionally, the UE in the RRC idle mode fails in the N attempts of the 2-step RACH procedure of the EDT, and the UE should fall back to the 2-step RACH procedure of the non-EDT, that is, transmitting uplink data by establishing the RRC connection and entering the RRC connected mode.

Optionally, the UE in the RRC idle mode fails in the N attempts of the 2-step RACH procedure of the EDT, and the UE should fall back to the 4-step RACH procedure of the non-EDT, that is, transmitting uplink data by establishing the RRC connection and entering the RRC connected mode.

Embodiment 3. EDT Based on the 4-Step RACH Procedure

This embodiment describes a method for a UE transmitting uplink data via a 4-step RACH procedure. Herein, the UE may transmit data carried by a UP or a CP via a 4-step RACH procedure. In this embodiment, the UE needs to perform the following steps:

Step 1: the UE transmitting a Msg1, wherein the Msg1 is a PRACH;

Step 2: the UE monitoring a Msg2 within a pre-configured time window;

Wherein, the Msg2 includes a PDSCH, wherein the PDSCH schedules the Msg3 via the MAC RAR, and the MAC RAR contains a Flag field, which is used to indicate whether the RACH procedure falls back to the non-EDT, and when indicating to fall back to the non-EDT, the TBS value of the Msg3 is less than that for EDT;

Step 3: the UE transmitting the Msg3, wherein the Msg3 is a PUSCH;

Step 4: the UE monitoring the retransmission scheduling of Msg3 (PUSCH) or Msg4 (composed of the PDCCH and the PDSCH). If the UE detects the retransmission scheduling of the Msg3, the UE retransmits the Msg3 and performs step 3 and step 4 in Embodiment 3 of the present application, until the RACH procedure contention ends (which may be successful, or may also be unsuccessful), or the contention window expires; if the UE detects the scheduling of Msg4, and the contention resolution signaling contained in Msg4 shows that the RACH procedure is successful, then the UE returns to the RRC idle mode (that is the RACH procedure of the EDT), or to transmit uplink data via establishing an RRC connection and entering the RRC connected mode (that is the RACH procedure falling back to the non-EDT).

Figure 10:
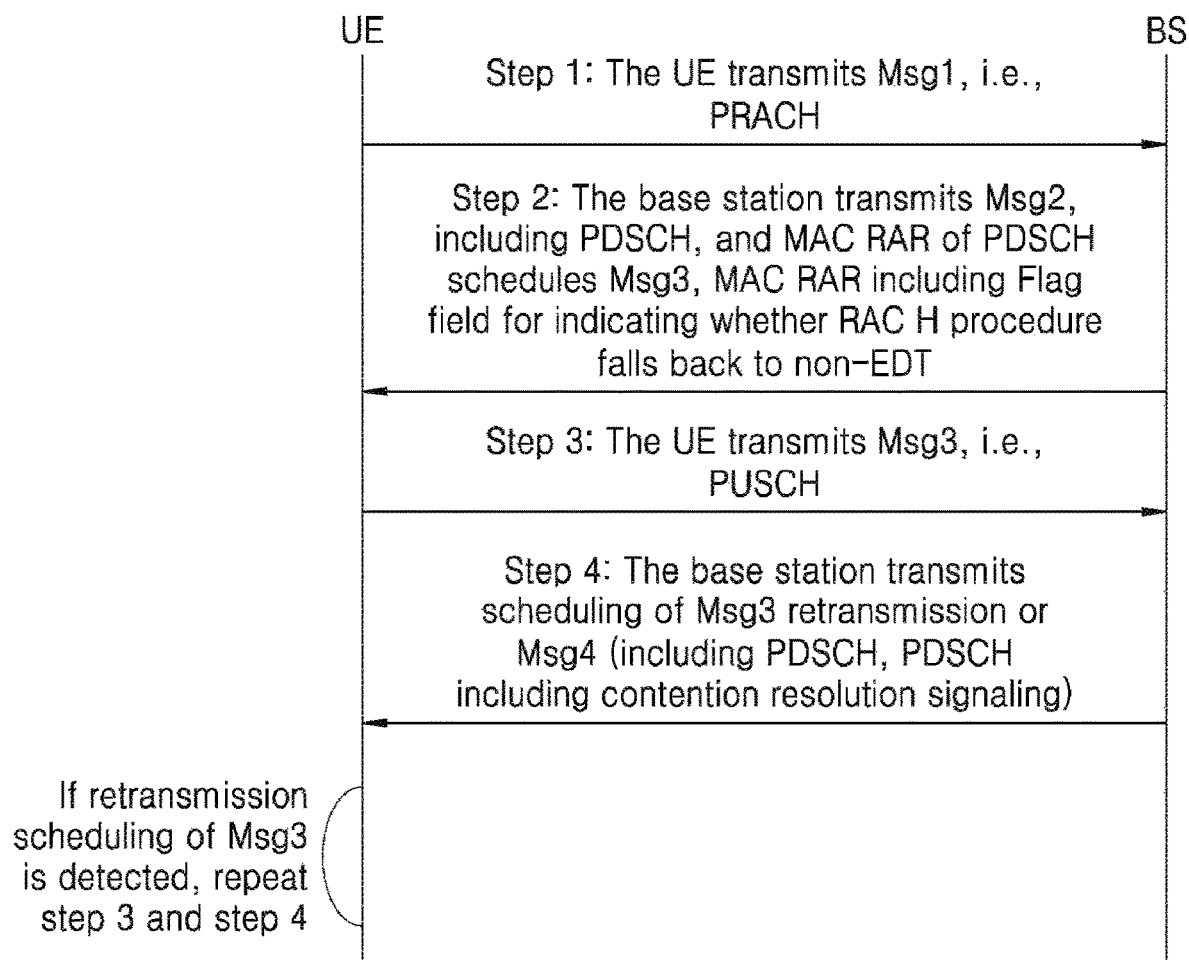
FIG. 10 is a schematic flowchart of a method for transmitting uplink data provided by Embodiment 3 of the present application.

FIG. 10 is a schematic flowchart of a method for transmitting uplink data provided by Embodiment 3 of the present application. Wherein, the base station may indicate via the MAC RAR that the UE falls back to the RACH procedure of the non-EDT, and the Msg3 TBS determined by the RACH procedure of the non-EDT is less than the Msg3 TBS determined by the RACH procedure of the EDT, and the UE may not be capable of carry all uplink data to be transmitted in the non-EDT RACH procedure. The UE does not return to the RRC idle mode after the non-EDT RACH procedure is successful. Instead, the UE establishes or restores the RRC connection and enters the RRC connected mode to transmit uplink data.

Optionally, the reserved bit "R" field of the MAC RAR of the existing system is used to indicate whether the RACH procedure falls back to the non-EDT, so that the payload size of MAC RAR in the existing system may not be increased; the UL Grant field contained in the MAC RAR has two different formats for EDT and non-EDT, that is, the RAR Grant of the non-EDT (the UL Grant contained in the MAC RAR) reuses the RAR Grant of the existing system, and the RAR Grant of the EDT may use a new design and/or new interpretation.

Figure 11:
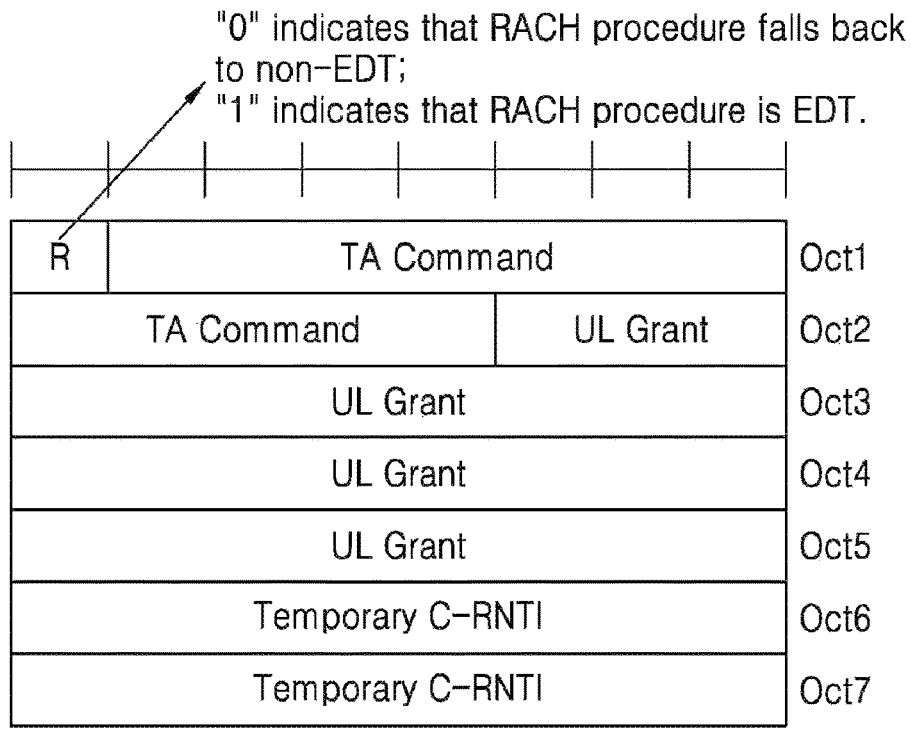
FIG. 11 is a schematic diagram showing an "R" field for indicating EDT or non-EDT, provided by an embodiment of the present application.

FIG. 11 is a schematic diagram showing an "R" field for indicating EDT or non-EDT, provided by an embodiment of the present application.

For example, as shown in FIG. 11, the indicated value of the "R" field is 0, indicating that the RACH procedure is non-EDT, and the interpretation of the UL Grant field of the MAC RAR is the same as the conventional RACH procedure, that is, reusing the RAR Grant format of the existing system. The indicated value of the "R" field is 1, indicating that the RACH procedure is EDT, and the interpretation of the UL Grant field of the MAC RAR is different from the non-EDT RACH procedure, and a new RAR Grant design for EDT may be used. Furthermore, for the EDT, the TBS of the Msg3 may be broadcasted by the system information, the MCS or TBS field of the original RAR Grant may be removed, and the extra bits may be used for other indication fields. This method is similar to the EDT of MTC in the existing LTE system.

Optionally, the payload size of RAR Grant in the existing system is kept unchanged, and a certain field of the UL Grant of the MAC RAR of the existing system is used to indicate whether the RACH procedure falls back to the non-EDT. For example, the EDT is indicated by a reserved value of a certain field, or the EDT is indicated by a state value of a certain field (i.e., the indication field in the non-EDT does not contain the state value).

Optionally, the UE in the RRC idle mode fails in the N times of the 4-step RACH procedure of the EDT, and the UE should fall back to the 4-step RACH procedure of the non-EDT to transmit uplink data, that is, establishing an RRC connection and entering the RRC connection to transmit uplink data. Here, N may be fixed by the system, for example, N is fixed to 1; N may also be configured by the system, for example, configured via cell system information.

Embodiment 4. EDT Supporting Multiple TBS Values for UE Selection

This embodiment describes a method for a UE in an RRC idle mode transmitting uplink data via a 2-step RACH or 4-step RACH procedure of an EDT, where the UE may transmit data carried by a UP or CP via a 2-step RACH or 4-step RACH procedure. In this embodiment, the UE needs to perform the following steps:

Step 1: the UE acquiring the TBS configuration of the EDT via the cell system information, wherein the PUSCH of the MsgA in the 2-step RACH procedure or the Msg3 (PUSCH) in the 4-step RACH procedure may be configured with multiple TBS values for UE selection;

Step 2: the UE selecting the most suitable TBS value among the configured multiple TBS values according to the size of the arrived uplink data, so as to minimize the size of padding bits of the MAC PDU;

Step 3: the UE determining the number of time units occupied by the PUSCH of the MsgA or the number of time units occupied by the Msg3 PUSCH according to the selected TBS value.

In this embodiment, the base station may configure one or more TBS values for the PUSCH of the MsgA or the Msg3 PUSCH via the cell system information, and the TBS value is also configurable for the system. When the base station configures multiple possible TBS values for the PUSCH of the MsgA or the Msg3 PUSCH via the cell system information, the UE selects the most suitable TBS value according to the size of uplink data to be transmitted, so as to reduce the size of padding bits of the MAC layer.

When the PUSCH of the MsgA or the Msg3 PUSCH is configured with multiple possible TBS values, theoretically, it is assumed that the transmission power of the UE on a single Resource Element (RE) remains the same for different TBS values, then the larger TBS value should require more physical resources to achieve an equivalent code rate, i.e., the base station should assign more physical resources for the larger TBS value.

In one example, different TBS values use the same frequency domain resource assignment, but correspond to different time domain resource assignments; assuming that the resource assigned at the smallest TBS value is used as the reference time-frequency resources, a larger TBS value needs to occupy reference time-frequency resources on the more time units, that is, the base station assigns more physical resources in the time domain for the larger TBS value.

Figure 12:
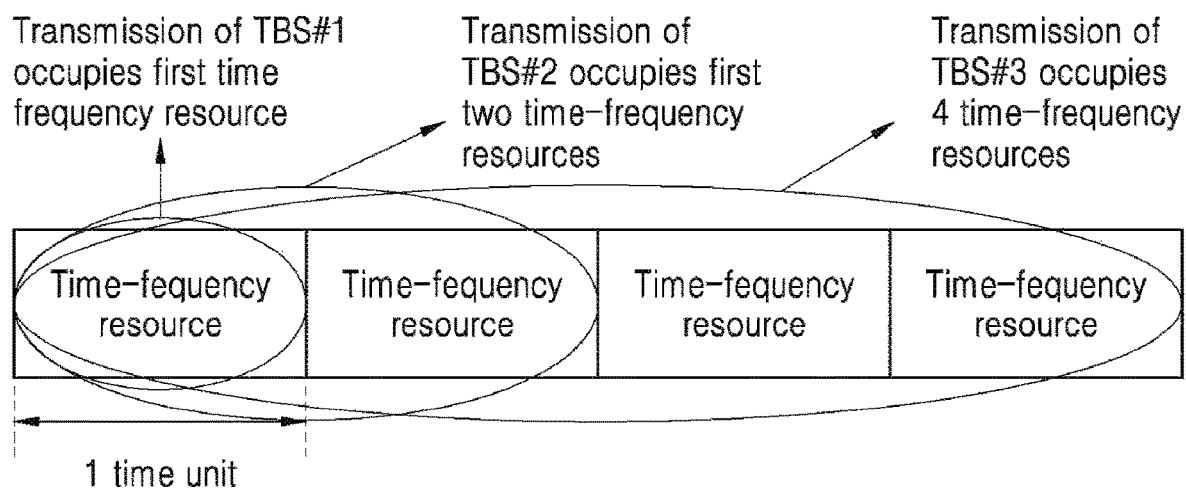
FIG. 12 is a schematic diagram of resources assignment corresponding to different TBS values, provided by an embodiment of the present application.

FIG. 12 is a schematic diagram of resources assignment corresponding to different TBS values, provided by an embodiment of the present application.

As shown in FIG. 12, the PUSCH of the MsgA or the Msg3 PUSCH is configured with 3 possible TBS values for UE selection, wherein, TBS #1<TBS #2<TBS #3; the transmission of the largest TBS value (i.e., TBS #3) occupies most physical resources, which needs to occupy 4 time-frequency resources across 4 time units; the transmission of TBS #2 occupies 2 time-frequency resources across 2 time units, which are the first two of the 4 time-frequency resources assigned for TBS #3; the transmission of TBS #1 occupies 1 time-frequency resource, which is the time first one of the 4 time-frequency resource assigned for TBS #3. Here, the time-frequency resource is a resource assignment in one time unit, and the time unit is 1 subframe or 1 slot (containing 14 OFDM/SC-FDMA symbols). Optionally, the time unit may also be 1 OFDM (SC-FDMA) symbol.

Optionally, the PUSCH of the MsgA or Msg3 PUSCH is configured to be transmitted based on multiple possible TBS values. For some TBS values, the number of time units assigned in the time domain exceeds 2 (including 2), and the transport block (TB) is based on the multiple time units for repeated transmission, that is, the coded and modulated TB is mapped to the time-frequency resource in one time unit, and is repeatedly transmitted in the time domain. For example, the number of repeat times of TBS #3 in FIG. 12 is 4, and the number of repeat times of TBS #2 is 2.

Optionally, the PUSCH of the MsgA or Msg3 PUSCH is configured to be transmitted based on multiple possible TBS values. For some TBS values, the number of time units assigned in the time domain exceeds 2 (including 2), and an overall rate matching is performed on the TB based on multiple time units, that is, the number of available REs for rate matching is the number of all REs in the multiple time units, and the coded and modulated TB is mapped to multiple time units, that is, a cross-time unit mapping. For example, TBS #3 in FIG. 12 is mapped to 4 time units, and TBS #2 is mapped to 2 time units.

Optionally, the PUSCH of the MsgA or Msg3 PUSCH is configured to be transmitted based on multiple possible TBS values. For some TBS values, the number of time units assigned in the time domain exceeds 2 (including 2), and transmission methods of the TB in multiple time units are configurable, for example, the system supports two transmission methods, of which one is that the TB is repeatedly transmitted in the multiple time units, and the other is that an overall rate matching is performed on the TB in the multiple time units, and it is possible to determine which transmission method to be used by configuring the cell system information.

Optionally, the base station configures that the PUSCH of the MsgA or the Msg3 PUSCH are transmitted based on multiple TBS values which can be selected by the UE. For a larger TBS value, the rate matching of the TB is based on the overall REs (Resource Element) of all time-frequency resources in multiple time units, and the system specifies that regardless of which TBS value transmission is selected by the UE, the positions of the DMRS symbols in respective time units are identical, that is, the positions of the DMRS symbols are independent of the TBS value actually selected by the UE.

Optionally, the PUSCH of the MsgA or Msg3 PUSCH is configured to be transmitted based on multiple possible TBS values. For a larger TBS value, the assigned PRBs are continuous in time domain. Herein, "continuous" means continuously in the elements in time units, which may not be completely continuous in time domain. For example, in FIG. 12, the time-frequency resource may not be full occupied in one time unit, and only a part of the OFDM (SC-FDMA) symbols within one slot (containing 14 OFDM/SC-FDMA symbols) are occupied. The resource assignment of multiple time-frequency resources in the time unit is identical, that is, occupying the same PRB position and OFDM (SC-FDMA) symbol position.

Optionally, the PUSCH of the MsgA or Msg3 PUSCH is configured to be transmitted based on multiple possible TBS values. For a larger TBS value, the assigned time-frequency resources may be discontinuous in time domain. For example, in FIG. 12, there is a time interval between two adjacent time-frequency resources, and the granularity of the time interval is one time unit, and the length of the time interval is predefined, or configurable, for example, configured in the cell system information. When the length of the time interval is configured to be 0, it means that the multiple time-frequency resources are continuous in time.

In an optional implementation manner, for the multiple time units assigned to the larger TBS value, any two adjacent time units have the same time interval. For example, in FIG. 12, the time intervals between the first time-frequency resource and the second time-frequency resource, between the second time-frequency resource and the third time-frequency resource, and the third time-frequency resource and the fourth time-frequency resource are identical.

In another optional implementation manner, for the multiple time units assigned to the larger TBS value, not all of any two adjacent time units have a time interval, and the system specifies that there is a time interval only after a last time unit of the TB transmission of a possible TBS value, which all time intervals are identical. For example, in FIG. 12, there is only a time interval between the first time-frequency resource and the second time-frequency resource, since the first time-frequency resource is the last time unit for the TBS #1 transmission; there is a time interval between the second time-frequency resource and the third time-frequency resource, since the second time-frequency resource is the last time unit for the TBS #2 transmission; there is no time interval between the third time-frequency resource and the fourth time-frequency resource, which is continuous in time.

Optionally, the base station configures the PUSCH of the MsgA or the Msg3 PUSCH to be transmitted based on multiple possible TBS values, and the physical resource corresponding to the minimum TBS value regularly occupies one time unit, and the number of time units occupied by the physical resources corresponding to other TBS values is deduced based on a predefined rule. For example, in FIG. 12, the transmission of the minimum TBS value (i.e., TBS #1) regularly occupies a time-frequency resource within one time unit, and the number (i.e., the number of the time-frequency resources) of time units occupied by the transmission of other TBS values (i.e., TBS #2 and TBS #3) may be calculated by the formula $$N = \left\lceil \frac{TBS_{EDT}}{TBS_{(EDTmin)}} \right\rceil;$$

herein, $TBS_{EDT}$ is a TBS value other than the minimum TBS value among the multiple TBS values supported by the EDT, $TBS_{EDTmin}$ is the minimum TBS value among the multiple TBS values supported by the EDT, $\lceil \cdot \rceil$ means the rounding up calculation, that is, the number of time units occupied by other TBS transmission is to round up the ratio of the TBS value to the minimum TBS value.

Optionally, the base station configures the PUSCH of the MsgA or the Msg3 PUSCH to be transmitted based on the multiple possible TBS values, and the physical resource corresponding to the minimum TBS value may also occupy multiple time units. For example, the PUSCH is repeatedly transmitted or overall rate matched based on the multiple time units. The base station will configure the number of time units occupied by the minimum TBS value or the maximum TBS value (i.e., the number of time-frequency resources), and the number of time units occupied by other TBS transmission may be calculated according to system-defined formulas.

For example, the number of time units occupied by other TBS transmission may be calculated by the formula $$N = \left\lceil \frac{TBS_{EDT}}{TBS_{EDTmin}} * N_{TBSmin} \right\rceil;$$

herein $TBS_{EDT}$ is a TBS value other than the minimum TBS value among the multiple TBS values supported by the EDT, $TBS_{EDTmin}$ is the minimum TBS value among the multiple TBS values supported by the EDT, $N_{TBSmin}$ is the number of time units occupied by the EDT transmission for the minimum TBS value configured for the system, and $\lceil \cdot \rceil$ means the rounding up calculation.

Optionally, the number of time units occupied by other TBS transmission may be calculated by the formula $$N = \left\lceil \frac{TBS_{EDT}}{TBS_{EDTmax}} * N_{TBSmax} \right\rceil;$$

herein $TBS_{EDT}$ is a TBS value other than the maximum TBS value among the multiple TBS values supported by the EDT, $TBS_{EDTmax}$ is the maximum TBS value among the multiple TBS values supported by the EDT, $N_{TBSmax}$ is the number of time units occupied by the EDT transmission for the maximum TBS value configured for the system, and $\lceil \cdot \rceil$ means the rounding up calculation.

Optionally, the base station configures the PUSCH in the MsgA or the Msg3 PUSCH to be transmitted based on the multiple possible TBS values, and the UE indicates the actually selected TBS value via the DMRS of the PUSCH; when receiving the PUSCH in the MsgA or the Msg3 PUSCH, the base station may firstly acquire the TBS information of the PUSCH by DMRS detection, and decode the PUSCH according to the acquired TBS information. The advantage of this design is that the base station does not need to perform blind decoding on the PUSCH based on different TBS assumptions.

Optionally, the base station configures the PUSCH in the MsgA or the Msg3 PUSCH to be transmitted based on 4 possible TBS values, and the UE may carry 2-bit information via the DMRS of the PUSCH, wherein the 2-bit information is used to indicate the TBS value actually selected by the UE among the four TBS values, and the DMRS may carry the 2-bit information based on 4 different cyclic shifts, or may carry the 2-bit information based on 4 different sequence generations.

Optionally, the base station configures the PUSCH in the MsgA or the Msg3 PUSCH to be transmitted based on the multiple possible TBS values, and the UE carries the actually selected TBS value via the piggyback method of the PUSCH, that is, the information bits carrying the TBS value are mapped to a part of REs of the PUSCH resources according to the method specified by system after coding and modulation, for example, mapped to the OFDM (SC-FDMA) symbol preceding and/or following the DMRS symbol. The PUSCH transmission should avoid these REs for carrying the TBS information, which specifically may use a puncturing method (the total number of available REs for rate matching contains these REs) or a rate matching method (the total number of available REs for rate matching does not contain these REs) for avoiding.

In an optional implementation manner, whether the transmission of the PUSCH of the MsgA or the Msg3 PUSCH actual occupies one or more time units, the information bits carrying the TBS value are only mapped to the first time unit after coding and modulation, that is, there is no mapping in other time units. In another optional solution, if the actual EDT transmission occupies multiple time units, the information bits carrying the TBS value are mapped to each time unit after coding and modulation, and the mapping is repeated in each time unit.

All the technical solutions provided by the embodiments of the present application may be used for transmitting uplink data by a UE in the RRC connected mode in addition to transmitting uplink data transmission by a UE in the RRC idle mode, and for example, when a UE in the RRC connected mode has arrived uplink data and uplink timing is out-of-synchronization or uplink SR is not responded.

Furthermore, all technical details of the 2-step RACH procedure provided by the present application may also be used for 2-step RACH procedures triggered by other events (non-EDT) in addition to 2-step RACH procedures triggered by the EDT, for example, trigger events may be RRC connection establishment, RRC connection re-establishment, uplink timing is out-of-synchronization, and uplink SR that is not responded.

Furthermore, all technical details of the 2-step RACH procedure provided by the present application may also be used for non-contention-based 2-step RACH procedures in addition to the contention-based 2-step RACH procedure, for example, 2-step RACH procedure for inter-cell handover, 2-step RACH procedure triggered by PDCCH order, etc.; when applying to non-contention-based 2-step RACH procedure, the above MsgB may not contain a contention resolution ID.

The foregoing embodiments introduce the method for transmitting uplink data. On the basis of the foregoing embodiments, the following describes the virtual device embodiment in detail, which is specifically as follows:

Embodiment 5

Figure 13:
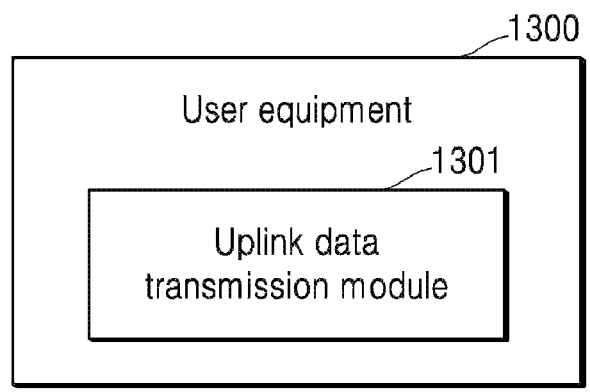
FIG. 13 is a schematic diagram illustrating a device structure of a UE according to an embodiment of the present application.

The embodiment of the present application provides a user equipment (UE). FIG. 13 is a schematic diagram illustrating a device structure of a UE according to an embodiment of the present application. As shown in FIG. 13, the UE 1300 includes: an uplink data transmission module 1301, wherein, The uplink data transmission module 1301 is configured to perform uplink data transmission by a contention-based random access (RACH) procedure.

In another possible implementation manner of the embodiment of the present application, the uplink data transmission module 1301 includes: a transmitting unit and a monitoring unit, wherein, the transmitting unit is configured to transmit a MsgA.

Wherein, the MsgA includes a PRACH, and a PUSCH, the PUSCH carrying the uplink data, and a UE contention resolution identifier (ID).

The monitoring unit is configured to monitor a MsgB.

Wherein the MsgB carries a UE contention resolution ID, and if the UE contention resolution ID carried by the MsgB is the same as the UE contention resolution ID carried by the PUSCH of the MsgA, the RACH procedure is characterized to be successfully contended.

In another possible implementation manner of the embodiment of the present application, the MsgB includes: a PDSCH; wherein, the PDSCH includes a MAC RAR corresponding to the UE, and the MAC RAR indicates the UE contention resolution ID.

In another possible implementation manner of the embodiment of the present application, the MAC RAR contains a Flag field; wherein, the Flag field indicates multiple types of MAC RARs, and different types of MAC RARs contains different control signaling fields, and the different types of MAC RARs have the same payload size or different payload sizes.

In another possible implementation manner of the embodiment of the present application, the Flag field contained in the MAC RAR is used to indicate two types of MAC RARs.

Wherein, the two types of MAC RARs include:
the first type of MAC RAR, containing a UE contention resolution ID, or containing a UE contention resolution ID and at least one of a TA Command and a TC-RNTI;
the second type of MAC RAR, containing a UL Grant, wherein the UL Grant is used to schedule PUSCH retransmission of the MsgA, or containing an UL Grant and at least one of a TA Command and a TC-RNTI.

In another possible implementation manner of the embodiment of the present application, the first type of MAC RAR further contains an ARI, and the ARI indicates a resource of a PUCCH of the ACK that feeds back the MsgB.

In another possible implementation manner of the embodiment of the present application, the MsgB contains DCI, and the DCI indicates the UE contention resolution ID.

In another possible implementation manner of the embodiment of the present application, the DCI contains a Flag field, and the Flag field contained in the DCI indicates two types of DCI;
wherein, the two types of DCIs include:
the first type of DCI, containing the UE contention resolution ID, or containing the UE contention resolution ID and at least one of a TA Command and a TC-RNTI;
the second type of DCI, containing the scheduling of the retransmission of the PUSCH of the MsgA, or containing the scheduling of the retransmission of the PUSCH in MsgA and at least one of a TA Command and a TC-RNTI.

In another possible implementation manner of the embodiment of the present application, the RNTI value for scrambling a CRC of the DCI is determined based on a time-frequency domain resource of the PRACH and a used preamble in the MsgA.

In another possible implementation manner of the embodiment of the present application, the MsgB contains an indicator, and the indicator is used to indicate a probability of the UE that is unsuccessful in a 2-step RACH procedure falling back to a 4-step RACH procedure.

In another possible implementation manner of the embodiment of the present application, the uplink data transmission module 1301 is specifically configured to: in an RRC idle mode, when there is uplink data to be transmitted and a first predefined condition is satisfied, perform uplink data transmission via a contention-based RACH procedure;

Wherein, the first predefined condition includes at least one of the following:
* 291the base station configures a MsgA resource for EDT in a cell system information block, and the MsgA resource for the EDT is different from the MsgA resource for non-EDT;
the size of uplink data to be transmitted satisfies the restriction of the maximum TBS of the PUSCH of the MsgA.

In another possible implementation manner of the embodiment of the present application, the uplink data transmission module 1301 is further configured to: in an RRC connected mode, when there is uplink data to be transmitted and a second predefined condition is satisfied, perform uplink data transmission via a contention-based RACH procedure;

the second predefined condition includes:
the base station configures a MsgA resource for EDT in a cell system information block, and the MsgA resource for the EDT is different from the MsgA resource for non-EDT;
the size of uplink data to be transmitted satisfies the restriction of the maximum TBS of the PUSCH of the MsgA;
and the second predefined condition further includes at least one of the following:
uplink timing is out-of-synchronization;
there are no available resources for an uplink SR within a pre-configured time window;
after transmitting the uplink SR, a response of a base station is not detected within a pre-configured time window;
the uplink data to be transmitted requires a low latency.

In another possible implementation manner of the embodiment of the present application, the uplink data transmission module 1301 may include: a receiving unit, an acquiring unit, a first determining unit, a second determining unit, and an uplink data transmission unit, wherein,
the receiving unit is configured to receive system broadcast information.
the acquiring unit is configured to acquire configuration about a TBS of the uplink data transmission.
the first determining unit is configured to determine, when multiple TBS values are included in the configuration of the TBS, the TBS value used by the uplink data transmission based on the size of the uplink data to be transmitted.

The second determining unit is configured to determine the number of time units occupied by the uplink data transmission, according to the determined TBS value used by the uplink data transmission.

For the embodiment of the present application, the first determining unit and the second determining unit may be the same determining unit, or may be different determining units, which are not limited in the embodiment of the present application.

The uplink data transmission unit is configured to perform the uplink data transmission according to the number of the time units determined by the second determining unit.

In another possible implementation manner of the embodiment of the present application, the time unit includes any one of the following: a subframe; a slot; an OFDM symbol; and a SC-FDMA.

In another possible implementation manner of the embodiment of the present application, the second determining unit is specifically configured to calculate a ratio between a TBS value used by the uplink data transmission and a minimum TBS value of the multiple TBS values, and determine an upward rounded value of the calculated ratio as the number of the time units occupied by the uplink data transmission.

In another possible implementation manner of the embodiment of the present application, when the uplink data transmission occupies multiple time units, a transmission manner in the multiple time units includes any one of the following:
repeatedly transmitting within the multiple time units;
performing rate matching within the multiple time units and transmitting at a matched code rate.

In another possible implementation manner of the embodiment of the present application, the UE 1300 further includes: a transmitting module, wherein,
the transmitting module is configured to: transmit, when performing the uplink data transmission, the TBS value used by the uplink data transmission to the base station by using a DMRS of the PUSCH; and/or, transmit, when performing uplink data transmission, the TBS value used by the uplink data transmission to the base station by a piggyback manner of the PUSCH.

The embodiment of the present application provides a user equipment. As compared with the uplink data transmission in the RRC connected mode in the prior art, the embodiment of the present application performs uplink data transmission via a contention-based RACH procedure, that is, a UE in an RRC idle mode does not need to establish an RRC connection when transmitting the uplink data for multiple times, and the uplink data may be directly transmitted via the RACH procedure, so that the power consumption of the UE, and the waste of system resources may be reduced.

The UE provided in this embodiment is applicable to the foregoing method embodiments, which details are not described herein again.

The foregoing embodiments describe embodiments of the method for transmit uplink data and a virtual device embodiment of the UE. The following describes an embodiment of the physical device of the UE, which is as follows:

Embodiment 6

Figure 14:
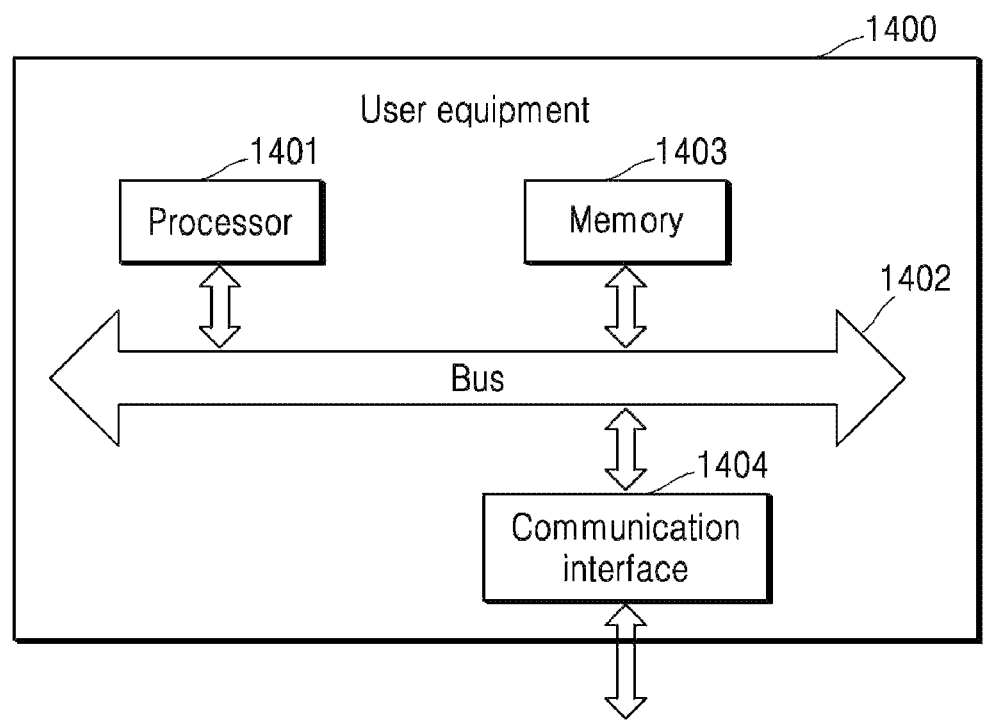
FIG. 14 is a schematic diagram illustrating a structure of a UE according to an embodiment of the present application.

The embodiment of the present application provides a UE. FIG. 14 is a schematic diagram illustrating a structure of a UE according to an embodiment of the present application. As shown in FIG. 14, the UE 1400 shown in FIG. 14 includes: a processor 1401 and a memory 1403. Wherein, the processor 1401 is connected to the memory 1403, for example, via a bus 1402. Optionally, the UE 1400 may also include a communication interface 1404, and the communication interface includes an antenna. It should be noted that, in actual applications, the number of the communication interfaces 1404 is not limited to one, and the structure of the UE 1400 does not construct a restriction on the embodiments of the present application.

The processor 1401 may be a CPU, a general-purpose processor, a DSP, an ASIC, and an FPGA or other programmable logic device, transistor logic device, hardware component, or any combination thereof. It is possible to implement or carry out the various illustrative logical blocks, modules and circuits described in connection with the disclosure of the present application. The processor 1401 may also be a combination of computing functions, such as one or more microprocessor combinations, a combination of a DSP and a microprocessor, and the like.

The bus 1402 may include a path for transferring information between the above components. The bus 1402 may be a PCI bus or an EISA bus. The bus 1402 may be divided into an address bus, a data bus, a control bus, and the like. For convenience of representation, only one thick line in FIG. 14 is used to represent the bus, but it does not mean that there is only one bus or one type of bus.

The memory 1403 may be a ROM or other type of static storage device that may store static information and instructions, RAM or other types of dynamic storage device that may store information and instruction, may also be EEPROM, CD-ROM or other optical disc storage, optical disc storage (including compression optical discs, laser discs, optical discs, digital versatile discs, Blu-ray discs, etc.), magnetic disk storage medium or other magnetic storage devices, or any other medium that may be used to carry or store desired program codes in form of instruction or data structure and may be accessed by the computer, but not limited to this.

The memory 1403 is used to store application program codes for executing the solution of the present application, and is controlled by the processor 1401 for execution. The processor 1401 is configured to execute the application program codes stored in the memory 1403 to implement the content shown in any of the foregoing method embodiments.

The embodiment of the present application provides a UE. As compared with the uplink data transmission in the RRC connected mode in the prior art, the embodiments of the present application perform uplink data transmission via a contention-based RACH procedure, that is, a UE in an RRC idle mode does not need to establish an RRC connection when transmitting the uplink data for multiple times, and the uplink data may be directly transmitted via the RACH procedure, so that the power consumption of the UE, and the waste of system resources may be reduced.

Embodiment 7

Figure 15:
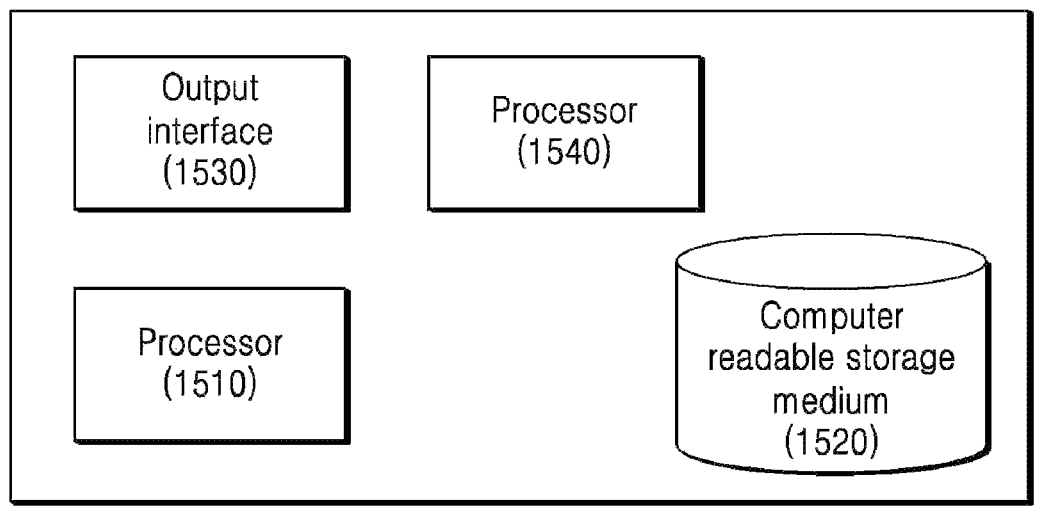
FIG. 15 is a framework diagram of a computing system in an embodiment of the present application.

FIG. 15 schematically illustrates a block diagram of a computing system that may be used to implement the UE of the present application according to the embodiment of the present application.

As shown in FIG. 15, the computing system 1500 includes a processor 1510, a computer readable storage medium 1520, an output interface 1530, and an input interface 1540. The computing system 1500 may perform the method described above in conjunction with FIG. 1 to implement uplink data transmission via a contention-based RACH in an RRC idle mode.

In particular, the processor 1510 may include, for example, a general-purpose microprocessor, an instruction set processor, and/or a related chipset and/or a special-purpose microprocessor (e.g., an application specific integrated circuit (ASIC)), and the like. The processor 1510 may also include an onboard memory for caching purposes. The processor 1510 may be a single processing unit or multiple processing units for performing different actions of the method flow described with reference to FIG. 1.

The computer readable storage medium 1520, for example, may be any media that is capable of containing, storing, transferring, propagating or transporting instructions. For example, the readable storage medium may include, but is not limited to, an electronic, magnetic, optical, electromagnetic, infrared, or semiconductor system, apparatus, device, or propagation medium. Specific examples of the readable storage medium include: a magnetic storage device such as a magnetic tape or a hard disk (HDD); an optical storage device such as a compact disk (CD-ROM); a memory such as a random access memory (RAM) or a flash memory; and/or a wired/wireless communication link.

The computer readable storage medium 1520 may include a computer program, which may include codes/computer executable instructions that, when executed by the processor 1510, cause the processor 1510 to perform, for example, the method flow described above in conjunction with FIG. 1 and any variations thereof.

Figure 16:
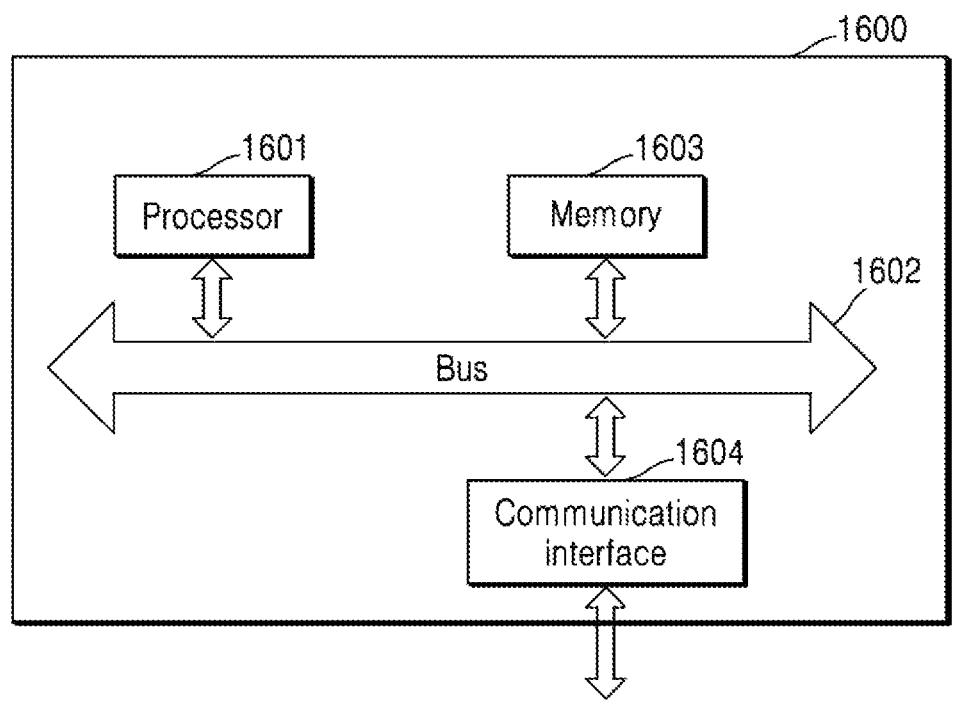
FIG. 16 is a schematic diagram illustrating a device structure of a base station according to an embodiment of the present application.

FIG. 16 is a schematic diagram illustrating a structure of a base station according to an embodiment of the present application. As shown in FIG. 16, the base station 1600 shown in FIG. 16 includes: a processor 1601 and a memory 1603. Wherein, the processor 1601 is connected to the memory 1603, for example, via a bus 1602. Optionally, the base station 1600 may also include a communication interface 1604, and the communication interface includes an antenna. It should be noted that, in actual applications, the number of the communication interfaces 1604 is not limited to one, and the structure of the base station 1600 does not construct a restriction on the embodiments of the present application.

The processor 1601 may be a CPU, a general-purpose processor, a DSP, an ASIC, and an FPGA or other programmable logic device, transistor logic device, hardware component, or any combination thereof. It is possible to implement or carry out the various illustrative logical blocks, modules and circuits described in connection with the disclosure of the present application. The processor 1601 may also be a combination of computing functions, such as one or more microprocessor combinations, a combination of a DSP and a microprocessor, and the like.

According to an embodiment of the disclosure, the processor 1601 according to an embodiment may perform the operation of the base station described above with reference to FIGS. 1 to 12.

The bus 1602 may include a path for transferring information between the above components. The bus 1602 may be a PCI bus or an EISA bus. The bus 1602 may be divided into an address bus, a data bus, a control bus, and the like. For convenience of representation, only one thick line in FIG. 16 is used to represent the bus, but it does not mean that there is only one bus or one type of bus.

The memory 1603 may be a ROM or other type of static storage device that may store static information and instructions, RAM or other types of dynamic storage device that may store information and instruction, may also be EEPROM, CD-ROM or other optical disc storage, optical disc storage (including compression optical discs, laser discs, optical discs, digital versatile discs, Blu-ray discs, etc.), magnetic disk storage medium or other magnetic storage devices, or any other medium that may be used to carry or store desired program codes in form of instruction or data structure and may be accessed by the computer, but not limited to this.

The memory 1603 is used to store application program codes for executing the solution of the present application, and is controlled by the processor 1601 for execution. The processor 1601 is configured to execute the application program codes stored in the memory 1603 to implement the content shown in any of the foregoing method embodiments.

For the embodiments of the present application, the foregoing embodiments may be applied to any system, including but not limited to a 5G NR system.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other sequences. Moreover, at least some of the steps in the flowchart of the drawings may include multiple sub-steps or stages, which are not necessarily performed at the same time, but may be executed at different times, and the order of execution thereof is not necessarily to be performed sequentially, but may be performed alternately or alternately with at least a portion of the sub-steps or stages of other steps or other steps.

The above is only a part of the embodiments of the present invention, and it should be noted that those skilled in the art may also make several improvements and retouching without departing from the principles of the present invention. Such modifications and retouching shall be regarded as falling into the protection scope of the present invention.

The invention claimed is:

1. A method performed by a user equipment (UE) in a wireless communication system, the method comprising:
    in case that a size of uplink data to be transmitted is less than or equal to a threshold value and a set of random access (RA) resources for early data transmission (EDT) is configured, transmitting to a base station, a message A including the uplink data, in a 2-step RA procedure; and
    receiving, from the base station, a message B
    including a UE contention resolution identifier (ID) and a physical uplink control channel (PUCCH) resource indicator for an acknowledgement (ACK) for the message B,
    wherein the set of RA resources for the EDT is different from a set of RA resources for non-EDT.

2. The method of claim 1, wherein, the message A is transmitted without transitioning to a radio resource control (RRC) active state.

3. The method of claim 1, further comprising:
    in response to the message B, transmitting, to the base station, the ACK on a PUCCH resource identified based on the PUCCH resource indicator.

4. The method of claim 1, wherein the UE contention resolution ID matches UE contention resolution ID related information included in the message A.

5. The method of claim 1, further comprising:
    monitoring the message B.

6. The method of claim 1, wherein the UE contention resolution ID is indicated by a medium access control (MAC) random access response (RAR) included in the message B.

7. A user equipment (UE) in a wireless communication system, the UE comprising:
    a transceiver; and
    at least one processor coupled with the transceiver and configured to:
        in case that a size of uplink data to be transmitted is less than or equal to a threshold value and a set of random access (RA) resources for early data transmission (EDT) is configured, transmit, to a base station via the transceiver, a message A including the uplink data, in a 2-step RA procedure; and
    receiving, from the bases station via the transceiver, a message B including
    a UE contention resolution identifier (ID) and a physical uplink control channel (PUCCH) resource indicator for an acknowledgement (ACK) for the message B,
    wherein the set of RA resources for the EDT is different from a set of RA resources for non-EDT.

8. A method performed by a base station in a wireless communication system, the method comprising:
    in case that a size of uplink data to be transmitted is less than or equal to a threshold value and a set of random access (RA) resources for early data transmission (EDT) is configured,
    receiving, from a user equipment (UE) a message A including the uplink data, in a 2-step RA procedure; and
    transmitting, to the UE, a message B including a UE contention resolution identifier (ID) and a physical uplink control channel (PUCCH) resource indicator for an acknowledgement (ACK) for the message B,
    wherein the set of RA resources for the EDT is different from a set of RA resources for non-EDT.

9. The method of claim 8, wherein the message A is transmitted without transitioning to a radio resource control (RRC) active state.

10. The method of claim 8, further comprising:
    in response to the message B, receiving, from the UE, the ACK on a PUCCH resource identified based on the PUCCH resource indicator.

11. The method of claim 8, wherein the UE contention resolution ID matches UE contention resolution ID related information included in the message A.

12. The method of claim 8, wherein the UE contention resolution ID is indicated by a medium access control (MAC) random access response (RAR) included in the message B.

13. A base station in a wireless communication system, the base station comprising:
    a transceiver; and
    at least one processor coupled with the transceiver and configured to:
        in case that a size of uplink data to be transmitted is less than or equal to a threshold value and a set of random access (RA) resources for early data transmission (EDT) is configured, receive, from a user equipment (UE) via the transceiver, a message A including the uplink data, in a 2-step RA procedure; and
        transmit, to the UE via the transceiver, a message B including a UE contention resolution identifier (ID) and a physical uplink control channel (PUCCH) resource indicator for an acknowledgement (ACK) for the message B,
    wherein the set of RA resources for the EDT is different from a set of RA resources for non-EDT.

* * * * *